United States Patent
Lofy

(10) Patent No.: US 10,228,166 B2
(45) Date of Patent: Mar. 12, 2019

(54) CONDENSATION AND HUMIDITY SENSORS FOR THERMOELECTRIC DEVICES

(71) Applicant: Gentherm Incorporated, Northville, MI (US)

(72) Inventor: John Lofy, Claremont, CA (US)

(73) Assignee: GENTHERM INCORPORATED, Northville, MI (US)

(*) Notice: Subject to any disclaimer, the term of this patent is extended or adjusted under 35 U.S.C. 154(b) by 211 days.

(21) Appl. No.: 15/145,445

(22) Filed: May 3, 2016

(65) Prior Publication Data

US 2016/0320104 A1 Nov. 3, 2016

Related U.S. Application Data

(63) Continuation of application No. 14/307,988, filed on Jun. 18, 2014, now Pat. No. 9,651,279, which is a
(Continued)

(51) Int. Cl.
*F25B 21/04* (2006.01)
*B60N 2/56* (2006.01)
(Continued)

(52) U.S. Cl.
CPC ........... *F25B 21/04* (2013.01); *B60N 2/5657* (2013.01); *B60N 2/5685* (2013.01);
(Continued)

(58) Field of Classification Search
CPC .......... F25B 21/02; F25B 21/04; F25B 49/00; F25B 2321/02; F25B 2321/023;
(Continued)

(56) References Cited

U.S. PATENT DOCUMENTS

| 1,839,156 A | 12/1931 | Lumpkin |
| 2,235,620 A | 3/1941 | Nessell |

(Continued)

FOREIGN PATENT DOCUMENTS

| CA | 979490 | 12/1975 |
| CN | 2128076 | 3/1993 |

(Continued)

OTHER PUBLICATIONS

Feher, Steve, "Thermoelectric Air Conditioned Variable Temperature Seat (VTS) & Effect Upon Vehicle Occupant Comfort, Vehicle Energy Efficiency, and Vehicle Environment Compatibility", SAE Technical Paper, Apr. 1993, pp. 341-349.
(Continued)

*Primary Examiner* — Marc E Norman
(74) *Attorney, Agent, or Firm* — Knobbe, Martens, Olson & Bear, LLP

(57) ABSTRACT

According to certain embodiments disclosed in the present application, a climate controlled seating assembly includes a thermal module. The thermal module comprises at least one inlet channel, at least one outlet channel and a thermoelectric device (e.g., Peltier circuit) positioned upstream of the outlet channel. In one embodiment, the seating assembly includes a sensor positioned within an interior of the thermal module and configured to detect the presence of a liquid, such as water, condensation or other fluids, on or near said sensor. In certain arrangements, the sensor is configured to detect the presence of a liquid by measuring an electrical resistance or capacitance across a portion of the sensor. A climate control system can include a separator gasket located within a housing of a fluid module and at least partially between the cold passage and the hot passage. In some embodiments, the separator gasket comprises one or more wicking materials. The separator gasket can be con-
(Continued)

figured to transport liquids from the cold passage to the hot passage.

24 Claims, 17 Drawing Sheets

Related U.S. Application Data continuation of application No. 13/963,216, filed on Aug. 9, 2013, now Pat. No. 9,335,073, which is a continuation of application No. 13/599,896, filed on Aug. 30, 2012, now Pat. No. 8,505,320, which is a continuation of application No. 12/364,285, filed on Feb. 2, 2009, now Pat. No. 8,256,236.

(60) Provisional application No. 61/025,719, filed on Feb. 1, 2008, provisional application No. 61/025,694, filed on Feb. 1, 2008.

(51) Int. Cl.
*F25B 49/00* (2006.01)
*F28D 15/00* (2006.01)

(52) U.S. Cl.
CPC ............ *B60N 2/5692* (2013.01); *F25B 49/00* (2013.01); *F28D 15/00* (2013.01)

(58) Field of Classification Search
CPC .. F25B 2321/025; F28D 15/00; F24F 13/222; B60N 2/5657; B60N 2/5685; B60N 2/5692
USPC ..................................... 62/3.1, 3.4
See application file for complete search history.

(56) References Cited

U.S. PATENT DOCUMENTS

| | | |
|---|---|---|
| 2,362,259 A | 11/1944 | Findley |
| 2,363,168 A | 11/1944 | Findley |
| 2,461,432 A | 2/1949 | Mitchell |
| 2,462,984 A | 3/1949 | Maddison |
| 2,493,067 A | 1/1950 | Goldsmith |
| 2,512,559 A | 6/1950 | Williams |
| 2,519,241 A | 8/1950 | Findley |
| 2,782,834 A | 2/1957 | Vigo |
| 2,791,956 A | 5/1957 | Guest |
| 2,813,708 A | 11/1957 | Frey |
| 2,884,956 A | 5/1959 | Perlin |
| 2,931,286 A | 4/1960 | Fry, Sr. et al. |
| 2,959,017 A | 11/1960 | Gilman et al. |
| 2,976,700 A | 3/1961 | Jackson |
| 2,984,077 A | 5/1961 | Gaskill |
| 3,019,609 A | 2/1962 | Pietsch |
| 3,030,145 A | 4/1962 | Kottemann |
| 3,039,817 A | 6/1962 | Taylor |
| 3,077,079 A | 2/1963 | Pietsch |
| 3,085,405 A | 4/1963 | Frantti |
| 3,090,206 A | 5/1963 | Anders |
| 3,136,577 A | 6/1964 | Richard |
| 3,137,142 A | 6/1964 | Venema |
| 3,137,523 A | 6/1964 | Karner |
| 3,138,934 A | 6/1964 | Roane |
| 3,178,894 A | 4/1965 | Mole et al. |
| 3,186,240 A | 6/1965 | Daubert |
| 3,197,342 A | 7/1965 | Neild |
| 3,212,275 A | 10/1965 | Tillman |
| 3,240,628 A | 3/1966 | Sonntag, Jr. |
| 3,253,649 A | 5/1966 | Laing |
| 3,266,064 A | 8/1966 | Figman |
| 3,282,267 A | 11/1966 | Eidus |
| 3,298,195 A | 1/1967 | Raskhodoff |
| 3,300,649 A | 1/1967 | Strawn |
| 3,325,312 A | 6/1967 | Sonntag, Jr. |
| 3,326,727 A | 6/1967 | Fritts |
| 3,351,498 A | 11/1967 | Shinn et al. |
| 3,366,164 A | 1/1968 | Newton |
| 3,392,535 A | 7/1968 | De Castelet |
| 3,486,177 A | 12/1969 | Marshack |
| 3,529,310 A | 9/1970 | Olmo |
| 3,550,523 A | 12/1970 | Segal |
| 3,599,437 A | 8/1971 | Panas |
| 3,615,870 A | 10/1971 | Crouthamel |
| 3,627,299 A | 12/1971 | Schwartze et al. |
| 3,632,451 A | 1/1972 | Abbott |
| 3,640,456 A | 2/1972 | Sturgis |
| 3,648,469 A | 3/1972 | Chapman |
| 3,703,141 A | 11/1972 | Pernoud |
| 3,767,470 A | 10/1973 | Hines |
| 3,786,230 A | 1/1974 | Brandenburg, Jr. |
| 3,819,418 A | 6/1974 | Winkler et al. |
| 3,839,876 A | 10/1974 | Privas |
| 3,870,568 A | 3/1975 | Oesterhelt et al. |
| 3,876,860 A | 4/1975 | Nomura et al. |
| 3,894,213 A | 7/1975 | Agarwala |
| 3,899,054 A | 8/1975 | Huntress et al. |
| 3,902,923 A | 9/1975 | Evans et al. |
| 3,916,151 A | 10/1975 | Reix |
| 3,926,052 A | 12/1975 | Bechtel |
| 3,927,299 A | 12/1975 | Sturgis |
| 3,928,876 A | 12/1975 | Starr |
| 4,002,108 A | 1/1977 | Drori |
| 4,044,824 A | 8/1977 | Eskeli |
| 4,124,794 A | 11/1978 | Eder |
| 4,195,687 A | 4/1980 | Taziker |
| 4,223,205 A | 9/1980 | Sturgis |
| 4,224,565 A | 9/1980 | Sosniak et al. |
| 4,281,516 A | 8/1981 | Berthet et al. |
| 4,315,599 A | 2/1982 | Biancardi |
| 4,336,444 A | 6/1982 | Bice et al. |
| 4,338,944 A | 7/1982 | Arkans |
| 4,391,009 A | 7/1983 | Schild et al. |
| 4,413,857 A | 11/1983 | Hayashi |
| 4,423,308 A | 12/1983 | Callaway et al. |
| 4,437,702 A | 3/1984 | Agosta |
| 4,438,070 A | 3/1984 | Stephens et al. |
| 4,459,428 A | 7/1984 | Chou |
| 4,491,173 A | 1/1985 | Demand |
| 4,493,939 A | 1/1985 | Blaske et al. |
| 4,497,973 A | 2/1985 | Heath et al. |
| 4,506,510 A | 3/1985 | Tircot |
| 4,518,700 A | 5/1985 | Stephens |
| 4,518,847 A | 5/1985 | Horst, Sr. et al. |
| 4,549,134 A | 10/1985 | Weiss |
| 4,554,968 A | 11/1985 | Haas |
| 4,567,351 A | 1/1986 | Kitagawa et al. |
| 4,572,430 A | 2/1986 | Takagi et al. |
| 4,639,883 A | 1/1987 | Michaelis |
| 4,665,707 A | 5/1987 | Hamilton |
| 4,671,567 A | 6/1987 | Frobose |
| 4,677,416 A | 6/1987 | Nishimoto et al. |
| 4,685,727 A | 8/1987 | Cremer et al. |
| 4,688,390 A | 8/1987 | Sawyer |
| 4,704,320 A | 11/1987 | Mizunoya et al. |
| 4,711,294 A | 12/1987 | Jacobs et al. |
| 4,712,832 A | 12/1987 | Antolini et al. |
| 4,777,802 A | 10/1988 | Feher |
| 4,782,664 A | 11/1988 | Sterna et al. |
| 4,791,274 A | 12/1988 | Horst |
| 4,793,651 A | 12/1988 | Inagaki et al. |
| 4,802,929 A | 2/1989 | Schock |
| 4,812,733 A | 3/1989 | Tobey |
| 4,823,554 A | 4/1989 | Trachtenberg et al. |
| 4,825,488 A | 5/1989 | Bedford |
| 4,828,627 A | 5/1989 | Connery |
| 4,853,992 A | 8/1989 | Yu |
| 4,923,248 A | 5/1990 | Feher |
| 4,947,648 A | 8/1990 | Harwell et al. |
| 4,969,684 A | 11/1990 | Zarotti |
| 4,981,324 A | 1/1991 | Law |
| 4,988,847 A | 1/1991 | Argos et al. |
| 4,997,230 A | 3/1991 | Spitalnick |
| 5,002,336 A | 3/1991 | Feher |

(56) References Cited

U.S. PATENT DOCUMENTS

| | | |
|---|---|---|
| 5,012,325 A | 4/1991 | Mansuria et al. |
| 5,014,909 A | 5/1991 | Yasuo |
| 5,016,304 A | 5/1991 | Ryhiner |
| 5,022,462 A | 6/1991 | Flint et al. |
| 5,057,490 A | 10/1991 | Skertic |
| 5,070,937 A | 12/1991 | Mougin et al. |
| 5,077,709 A | 12/1991 | Feher |
| 5,088,790 A | 2/1992 | Wainwright et al. |
| 5,097,674 A | 3/1992 | Imaiida et al. |
| 5,102,189 A | 4/1992 | Saito et al. |
| 5,106,161 A | 4/1992 | Meiller |
| 5,111,025 A | 5/1992 | Barma et al. |
| 5,111,664 A | 5/1992 | Yang |
| 5,117,638 A | 6/1992 | Feher |
| 5,119,640 A | 6/1992 | Conrad |
| 5,125,238 A | 6/1992 | Ragan et al. |
| 5,148,977 A | 9/1992 | Hibino et al. |
| 5,166,777 A | 11/1992 | Kataoka |
| 5,187,349 A | 2/1993 | Curhan et al. |
| 5,188,286 A | 2/1993 | Pence, IV |
| 5,255,735 A | 10/1993 | Raghava et al. |
| 5,256,857 A | 10/1993 | Curhan et al. |
| 5,265,599 A | 11/1993 | Stephenson et al. |
| 5,278,936 A | 1/1994 | Shao |
| 5,279,128 A | 1/1994 | Tomatsu et al. |
| 5,335,381 A | 8/1994 | Chang |
| 5,367,728 A | 11/1994 | Chang |
| 5,372,402 A | 12/1994 | Kuo |
| 5,375,421 A | 12/1994 | Hsieh |
| 5,382,075 A | 1/1995 | Shih |
| 5,385,382 A | 1/1995 | Single, II et al. |
| 5,409,547 A | 4/1995 | Watanabe et al. |
| 5,413,166 A | 5/1995 | Single, II et al. |
| 5,416,935 A | 5/1995 | Nieh |
| 5,419,489 A | 5/1995 | Burd |
| 5,419,780 A | 5/1995 | Suski |
| 5,430,322 A | 7/1995 | Koyanagi et al. |
| 5,448,788 A | 9/1995 | Wu |
| 5,448,891 A | 9/1995 | Nakagiri et al. |
| 5,456,081 A | 10/1995 | Chrysler et al. |
| 5,473,783 A | 12/1995 | Allen |
| 5,493,742 A | 2/1996 | Klearman |
| 5,493,864 A | 2/1996 | Pomerence et al. |
| 5,497,632 A | 3/1996 | Robinson |
| 5,505,520 A | 4/1996 | Frusti et al. |
| 5,515,238 A | 5/1996 | Fritz et al. |
| 5,524,439 A | 6/1996 | Gallup et al. |
| 5,542,503 A | 8/1996 | Dunn et al. |
| 5,544,487 A | 8/1996 | Attey et al. |
| 5,544,488 A | 8/1996 | Reid |
| 5,555,732 A | 9/1996 | Whiticar |
| 5,561,981 A | 10/1996 | Quisenberry et al. |
| 5,576,512 A | 11/1996 | Doke |
| 5,584,084 A | 12/1996 | Klearman et al. |
| 5,584,183 A | 12/1996 | Wright et al. |
| 5,597,200 A | 1/1997 | Gregory et al. |
| 5,601,399 A | 2/1997 | Okpara et al. |
| 5,606,639 A | 2/1997 | Lehoe et al. |
| 5,613,729 A | 3/1997 | Summer, Jr. |
| 5,613,730 A | 3/1997 | Buie et al. |
| 5,623,828 A | 4/1997 | Harrington |
| 5,626,021 A | 5/1997 | Karunasiri et al. |
| 5,626,386 A | 5/1997 | Lush |
| 5,634,342 A | 6/1997 | Peeters et al. |
| 5,637,921 A | 6/1997 | Burward-Hoy |
| 5,640,728 A | 6/1997 | Graebe |
| 5,642,539 A | 7/1997 | Kuo |
| 5,645,314 A | 7/1997 | Liou |
| 5,650,904 A | 7/1997 | Gilley et al. |
| 5,653,741 A | 8/1997 | Grant |
| 5,667,622 A | 9/1997 | Hasegawa et al. |
| 5,675,852 A | 10/1997 | Watkins |
| 5,690,849 A | 11/1997 | DeVilbiss et al. |
| 5,692,952 A | 12/1997 | Chih-Hung |
| 5,704,213 A | 1/1998 | Smith et al. |
| 5,715,695 A | 2/1998 | Lord |
| 5,721,804 A | 2/1998 | Greene, III |
| 5,724,818 A | 3/1998 | Iwata et al. |
| 5,729,981 A | 3/1998 | Markus et al. |
| 5,761,908 A | 6/1998 | Oas et al. |
| 5,761,909 A | 6/1998 | Hughes et al. |
| 5,798,583 A | 8/1998 | Morita |
| 5,800,490 A | 9/1998 | Patz et al. |
| 5,802,855 A | 9/1998 | Yamaguchi et al. |
| 5,802,856 A | 9/1998 | Schaper et al. |
| 5,822,993 A | 10/1998 | Attey |
| 5,827,424 A | 10/1998 | Gillis et al. |
| 5,833,321 A | 11/1998 | Kim et al. |
| 5,850,741 A | 12/1998 | Feher |
| 5,865,031 A | 2/1999 | Itakura |
| 5,871,151 A | 2/1999 | Fiedrich |
| 5,884,485 A | 3/1999 | Yamaguchi et al. |
| 5,884,486 A | 3/1999 | Hughes et al. |
| 5,887,304 A | 3/1999 | Von der Heyde |
| 5,888,261 A | 3/1999 | Fortune |
| 5,895,964 A | 4/1999 | Nakayama |
| 5,902,014 A | 5/1999 | Dinkel et al. |
| 5,921,100 A | 7/1999 | Yoshinori et al. |
| 5,921,314 A | 7/1999 | Schuller et al. |
| 5,921,858 A | 7/1999 | Kawai et al. |
| 5,924,289 A | 7/1999 | Bishop, II |
| 5,924,766 A | 7/1999 | Esaki et al. |
| 5,924,767 A | 7/1999 | Pietryga |
| 5,927,817 A | 7/1999 | Ekman et al. |
| 5,934,748 A | 8/1999 | Faust et al. |
| 5,936,192 A | 8/1999 | Tauchi |
| 5,937,908 A | 8/1999 | Inoshiri et al. |
| 5,948,303 A | 9/1999 | Larson |
| 5,950,067 A | 9/1999 | Maegawa et al. |
| 5,952,728 A | 9/1999 | Imanishi et al. |
| 5,987,893 A | 11/1999 | Schultz-Harder et al. |
| 5,988,568 A | 11/1999 | Drews |
| 5,992,154 A | 11/1999 | Kawada et al. |
| 5,994,637 A | 11/1999 | Imanushi et al. |
| 5,995,711 A | 11/1999 | Fukuoka et al. |
| 6,000,225 A | 12/1999 | Ghoshal |
| 6,003,950 A | 12/1999 | Larsson |
| 6,006,524 A | 12/1999 | Park |
| 6,019,420 A | 2/2000 | Faust et al. |
| 6,038,865 A | 3/2000 | Watanabe et al. |
| 6,048,024 A | 4/2000 | Wallman |
| 6,049,655 A | 4/2000 | Vazirani |
| 6,052,853 A | 4/2000 | Schmid |
| 6,053,163 A | 4/2000 | Bass |
| 6,059,018 A | 5/2000 | Yoshinori et al. |
| 6,062,641 A | 5/2000 | Suzuki et al. |
| 6,072,924 A | 6/2000 | Sato et al. |
| 6,072,938 A | 6/2000 | Peterson et al. |
| 6,073,998 A | 6/2000 | Siarkowski et al. |
| 6,079,485 A | 6/2000 | Esaki et al. |
| 6,084,172 A | 7/2000 | Kishi et al. |
| 6,085,369 A | 7/2000 | Feher |
| 6,086,831 A | 7/2000 | Harness et al. |
| 6,087,638 A | 7/2000 | Silverbrook |
| 6,094,919 A | 8/2000 | Bhatia |
| 6,097,088 A | 8/2000 | Sakuragi |
| 6,100,463 A | 8/2000 | Ladd et al. |
| 6,101,815 A | 8/2000 | Van Oort et al. |
| 6,105,373 A | 8/2000 | Watanabe et al. |
| 6,109,688 A | 8/2000 | Wurz et al. |
| 6,112,525 A | 9/2000 | Yoshida et al. |
| 6,112,531 A | 9/2000 | Yamaguchi |
| 6,116,029 A | 9/2000 | Krawec |
| 6,119,463 A | 9/2000 | Bell |
| 6,120,370 A | 9/2000 | Asou et al. |
| 6,127,619 A | 10/2000 | Xi et al. |
| 6,141,969 A | 11/2000 | Launchbury et al. |
| 6,145,925 A | 11/2000 | Eksin et al. |
| 6,158,224 A | 12/2000 | Hu et al. |
| 6,161,241 A | 12/2000 | Zysman |
| 6,161,388 A | 12/2000 | Ghoshal |
| 6,164,076 A | 12/2000 | Chu et al. |
| 6,164,719 A | 12/2000 | Rauh |
| 6,171,333 B1 | 1/2001 | Nelson et al. |

(56) References Cited

U.S. PATENT DOCUMENTS

| | | |
|---|---|---|
| 6,178,292 B1 | 1/2001 | Fukuoka et al. |
| 6,179,706 B1 | 1/2001 | Yoshinori et al. |
| 6,186,592 B1 | 2/2001 | Orizakis et al. |
| 6,189,966 B1 | 2/2001 | Faust et al. |
| 6,189,967 B1 | 2/2001 | Short |
| 6,196,627 B1 | 3/2001 | Faust et al. |
| 6,196,839 B1 | 3/2001 | Ross |
| 6,206,465 B1 | 3/2001 | Faust et al. |
| 6,213,198 B1 | 4/2001 | Shikata et al. |
| 6,222,243 B1 | 4/2001 | Kishi et al. |
| 6,223,539 B1 | 5/2001 | Bell |
| 6,233,959 B1 | 5/2001 | Kang et al. |
| 6,250,083 B1 | 6/2001 | Chou |
| 6,256,996 B1 | 7/2001 | Ghoshal |
| 6,262,357 B1 | 7/2001 | Johnson et al. |
| 6,263,530 B1 | 7/2001 | Feher |
| 6,266,962 B1 | 7/2001 | Ghoshal |
| 6,282,907 B1 | 9/2001 | Ghoshal |
| 6,289,982 B1 | 9/2001 | Naji |
| 6,291,803 B1 | 9/2001 | Fourrey |
| 6,306,673 B1 | 10/2001 | Imanishi et al. |
| 6,326,610 B1 | 12/2001 | Muramatsu et al. |
| 6,336,237 B1 | 1/2002 | Schmid |
| 6,338,251 B1 | 1/2002 | Ghoshal |
| 6,341,395 B1 | 1/2002 | Chao |
| 6,347,521 B1 | 2/2002 | Kadotani et al. |
| 6,378,311 B1 | 4/2002 | McCordic |
| 6,385,976 B1 | 5/2002 | Yamamura et al. |
| 6,391,676 B1 | 5/2002 | Tsuzaki et al. |
| 6,393,842 B2 | 5/2002 | Kim et al. |
| 6,400,013 B1 | 6/2002 | Tsuzaki et al. |
| 6,402,470 B1 | 6/2002 | Kvasnak et al. |
| 6,410,971 B1 | 6/2002 | Otey |
| 6,425,527 B1 | 7/2002 | Smole |
| 6,427,449 B1 | 8/2002 | Logan et al. |
| 6,434,328 B2 | 8/2002 | Rutherford |
| 6,452,740 B1 | 9/2002 | Ghoshal |
| 6,470,696 B1 | 10/2002 | Palfy et al. |
| 6,474,073 B1 | 11/2002 | Uetsuji et al. |
| 6,481,801 B1 | 11/2002 | Schmale |
| 6,487,739 B1 | 12/2002 | Harker |
| 6,489,551 B2 | 12/2002 | Chu et al. |
| 6,490,879 B1 | 12/2002 | Lloyd et al. |
| 6,492,585 B1 | 12/2002 | Zamboni et al. |
| 6,493,888 B1 | 12/2002 | Salvatini et al. |
| 6,493,889 B2 | 12/2002 | Kocurek |
| 6,509,704 B1 | 1/2003 | Brown |
| 6,511,125 B1 | 1/2003 | Gendron |
| 6,519,949 B1 | 2/2003 | Wernlund et al. |
| 6,539,725 B2 | 4/2003 | Bell |
| 6,541,737 B1 | 4/2003 | Eksin et al. |
| 6,541,743 B2 | 4/2003 | Chen |
| 6,546,576 B1 | 4/2003 | Lin |
| 6,548,894 B2 | 4/2003 | Chu et al. |
| 6,552,256 B2 | 4/2003 | Shakouri et al. |
| RE38,128 E | 6/2003 | Gallup et al. |
| 6,571,564 B2 | 6/2003 | Upadhye et al. |
| 6,573,596 B2 | 6/2003 | Saika |
| 6,574,967 B1 | 6/2003 | Park et al. |
| 6,580,025 B2 | 6/2003 | Guy |
| 6,581,225 B1 | 6/2003 | Imai |
| 6,583,638 B2 | 6/2003 | Costello et al. |
| 6,598,251 B2 | 7/2003 | Habboub et al. |
| 6,598,405 B2 | 7/2003 | Bell |
| 6,604,576 B2 | 8/2003 | Noda et al. |
| 6,604,785 B2 | 8/2003 | Bargheer et al. |
| 6,605,955 B1 | 8/2003 | Costello et al. |
| 6,606,754 B2 | 8/2003 | Flick |
| 6,606,866 B2 | 8/2003 | Bell |
| 6,619,044 B2 | 9/2003 | Batchelor et al. |
| 6,619,736 B2 | 9/2003 | Stowe et al. |
| 6,625,990 B2 | 9/2003 | Bell |
| 6,626,488 B2 | 9/2003 | Pfahler |
| 6,629,724 B2 | 10/2003 | Ekern et al. |
| 6,637,210 B2 | 10/2003 | Bell |
| 6,644,735 B2 | 11/2003 | Bargheer et al. |
| 6,672,076 B2 | 1/2004 | Bell |
| 6,676,207 B2 | 1/2004 | Rauh et al. |
| 6,684,437 B2 | 2/2004 | Koenig |
| 6,686,532 B1 | 2/2004 | Macris |
| 6,687,937 B2 | 2/2004 | Harker |
| 6,695,402 B2 | 2/2004 | Sloan, Jr. |
| 6,700,052 B2 | 3/2004 | Bell |
| 6,705,089 B2 | 3/2004 | Chu et al. |
| 6,708,352 B2 | 3/2004 | Salvatini et al. |
| 6,711,767 B2 | 3/2004 | Klamm |
| 6,711,904 B1 | 3/2004 | Law et al. |
| 6,719,039 B2 | 4/2004 | Calaman et al. |
| 6,725,669 B2 | 4/2004 | Melaragni |
| 6,727,422 B2 | 4/2004 | Macris |
| 6,730,115 B1 | 5/2004 | Heaton |
| 6,739,138 B2 | 5/2004 | Saunders et al. |
| 6,739,655 B1 | 5/2004 | Schwochert et al. |
| 6,743,972 B2 | 6/2004 | Macris |
| 6,761,399 B2 | 7/2004 | Bargheer et al. |
| 6,764,502 B2 | 7/2004 | Bieberich |
| 6,767,766 B2 | 7/2004 | Chu et al. |
| 6,772,829 B2 | 8/2004 | Lebrun |
| 6,774,346 B2 | 8/2004 | Clothier |
| 6,786,541 B2 | 9/2004 | Haupt et al. |
| 6,786,545 B2 | 9/2004 | Bargheer et al. |
| 6,790,481 B2 | 9/2004 | Bishop et al. |
| 6,793,016 B2 | 9/2004 | Aoki et al. |
| 6,804,966 B1 | 10/2004 | Chu et al. |
| 6,808,230 B2 | 10/2004 | Buss et al. |
| 6,812,395 B2 | 11/2004 | Bell |
| 6,815,814 B2 | 11/2004 | Chu et al. |
| 6,817,191 B2 | 11/2004 | Watanabe |
| 6,817,197 B1 | 11/2004 | Padfield |
| 6,817,675 B2 | 11/2004 | Buss et al. |
| 6,818,817 B2 | 11/2004 | Macris |
| 6,823,678 B1 | 11/2004 | Li |
| 6,828,528 B2 | 12/2004 | Stowe et al. |
| 6,834,509 B2 | 12/2004 | Palfy et al. |
| 6,840,305 B2 | 1/2005 | Zheng et al. |
| 6,840,576 B2 | 1/2005 | Ekern et al. |
| 6,841,957 B2 | 1/2005 | Brown |
| 6,845,622 B2 | 1/2005 | Sauciuc et al. |
| 6,855,158 B2 | 2/2005 | Stolpmann |
| 6,855,880 B2 | 2/2005 | Feher |
| 6,857,697 B2 | 2/2005 | Brennan et al. |
| 6,857,954 B2 | 2/2005 | Luedtke |
| 6,868,690 B2 | 3/2005 | Faqih |
| 6,871,365 B2 | 3/2005 | Flick et al. |
| 6,886,351 B2 | 5/2005 | Palfy et al. |
| 6,892,807 B2 | 5/2005 | Fristedt et al. |
| 6,893,086 B2 | 5/2005 | Bajic et al. |
| 6,904,629 B2 | 6/2005 | Wu |
| 6,907,739 B2 | 6/2005 | Bell |
| 6,923,216 B2 | 8/2005 | Extrand et al. |
| 6,935,122 B2 | 8/2005 | Huang |
| 6,954,944 B2 | 10/2005 | Feher |
| 6,959,555 B2 | 11/2005 | Bell |
| 6,962,195 B2 | 11/2005 | Smith et al. |
| 6,963,053 B2 | 11/2005 | Lutz |
| 6,967,309 B2 | 11/2005 | Wyatt et al. |
| 6,976,734 B2 | 12/2005 | Stoewe |
| 6,977,360 B2 | 12/2005 | Weiss |
| 6,981,380 B2 | 1/2006 | Chrysler et al. |
| 6,990,701 B1 | 1/2006 | Litvak |
| 7,000,490 B1 | 2/2006 | Micheels |
| 7,036,163 B2 | 5/2006 | Schmid |
| 7,040,710 B2 | 5/2006 | White et al. |
| 7,052,091 B2 | 5/2006 | Bajic et al. |
| 7,063,163 B2 | 6/2006 | Steele et al. |
| 7,066,306 B2 | 6/2006 | Gavin |
| 7,070,231 B1 | 7/2006 | Wong |
| 7,070,232 B2 | 7/2006 | Minegishi et al. |
| 7,075,034 B2 | 7/2006 | Bargheer et al. |
| 7,082,772 B2 | 8/2006 | Welch |
| 7,084,502 B2 | 8/2006 | Bottner et al. |
| 7,100,978 B2 | 9/2006 | Ekern et al. |
| 7,108,319 B2 | 9/2006 | Hartwich et al. |
| 7,111,465 B2 | 9/2006 | Bell |

(56) References Cited

U.S. PATENT DOCUMENTS

| | | |
|---|---|---|
| 7,114,771 B2 | 10/2006 | Lofy et al. |
| 7,124,593 B2 | 10/2006 | Feher |
| 7,131,689 B2 | 11/2006 | Brennan et al. |
| 7,134,715 B1 | 11/2006 | Fristedt et al. |
| 7,141,763 B2 | 11/2006 | Moroz |
| 7,147,279 B2 | 12/2006 | Bevan et al. |
| 7,165,281 B2 | 1/2007 | Larssson et al. |
| 7,168,758 B2 | 1/2007 | Bevan et al. |
| 7,178,344 B2 | 2/2007 | Bell |
| 7,201,441 B2 | 4/2007 | Stoewe et al. |
| 7,213,876 B2 | 5/2007 | Stoewe |
| 7,220,048 B2 | 5/2007 | Kohlgrüber et al. |
| 7,224,059 B2 | 5/2007 | Shimada et al. |
| 7,231,772 B2 | 6/2007 | Bell |
| 7,244,887 B2 | 7/2007 | Miley |
| 7,246,496 B2 | 7/2007 | Goenka et al. |
| 7,272,936 B2 | 9/2007 | Feher |
| 7,273,981 B2 | 9/2007 | Bell |
| 7,299,639 B2 | 11/2007 | Leija et al. |
| 7,337,615 B2 | 3/2008 | Reidy |
| 7,338,117 B2 | 3/2008 | Iqbal et al. |
| 7,340,907 B2 | 3/2008 | Vogh et al. |
| 7,355,146 B2 | 4/2008 | Angelis et al. |
| 7,356,912 B2 | 4/2008 | Iqbal et al. |
| 7,360,365 B2 | 4/2008 | Codecasa et al. |
| 7,360,416 B2 | 4/2008 | Manaka et al. |
| 7,370,479 B2 | 5/2008 | Pfannenberg |
| 7,370,911 B2 | 5/2008 | Bajic et al. |
| 7,380,586 B2 | 6/2008 | Gawthrop |
| 7,425,034 B2 | 9/2008 | Bajic et al. |
| 7,426,835 B2 | 9/2008 | Bell et al. |
| 7,462,028 B2 | 12/2008 | Cherala et al. |
| 7,469,432 B2 | 12/2008 | Chambers |
| 7,475,464 B2 | 1/2009 | Lofy et al. |
| 7,475,938 B2 | 1/2009 | Stoewe et al. |
| 7,478,869 B2 | 1/2009 | Lazanja et al. |
| 7,480,950 B2 | 1/2009 | Feher |
| 7,506,924 B2 | 3/2009 | Bargheer et al. |
| 7,506,938 B2 | 3/2009 | Brennan et al. |
| 7,513,273 B2 | 4/2009 | Bivin |
| 7,581,785 B2 | 9/2009 | Heckmann et al. |
| 7,587,901 B2 | 9/2009 | Petrovski |
| 7,587,902 B2 | 9/2009 | Bell |
| 7,591,507 B2 | 9/2009 | Giffin et al. |
| 7,608,777 B2 | 10/2009 | Bell et al. |
| 7,621,594 B2 | 11/2009 | Hartmann et al. |
| 7,640,754 B2 | 1/2010 | Wolas |
| 7,665,803 B2 | 2/2010 | Wolas |
| 7,708,338 B2 | 5/2010 | Wolas |
| 7,731,279 B2 | 6/2010 | Asada et al. |
| RE41,765 E | 9/2010 | Gregory et al. |
| 7,827,620 B2 | 11/2010 | Feher |
| 7,827,805 B2 | 11/2010 | Comiskey et al. |
| 7,862,113 B2 | 1/2011 | Knoll |
| 7,866,017 B2 | 1/2011 | Knoll |
| 7,877,827 B2 | 2/2011 | Marquette et al. |
| 7,927,805 B2 | 4/2011 | Raponi et al. |
| 7,937,789 B2 | 5/2011 | Feher |
| 7,963,594 B2 | 6/2011 | Wolas |
| 7,966,835 B2 | 6/2011 | Petrovski |
| 7,969,738 B2 | 6/2011 | Koo |
| 7,996,936 B2 | 8/2011 | Marquette et al. |
| 8,062,797 B2 | 11/2011 | Fisher et al. |
| 8,065,763 B2 | 11/2011 | Brykalski et al. |
| 8,104,295 B2 | 1/2012 | Lofy |
| 8,143,554 B2 | 3/2012 | Lofy |
| 8,181,290 B2 | 5/2012 | Brykalski et al. |
| 8,191,187 B2 | 6/2012 | Brykalski et al. |
| 8,222,511 B2 | 7/2012 | Lofy |
| 8,256,236 B2 | 9/2012 | Lofy |
| 8,332,975 B2 | 12/2012 | Brykalski et al. |
| 8,402,579 B2 | 3/2013 | Marquette et al. |
| 8,418,286 B2 | 4/2013 | Brykalski et al. |
| 8,434,314 B2 | 5/2013 | Comiskey et al. |
| 8,438,863 B2 | 5/2013 | Lofy |
| RE44,272 E | 6/2013 | Bell |
| 8,505,320 B2 | 8/2013 | Lofy |
| 8,516,842 B2 | 8/2013 | Petrovski |
| 8,539,624 B2 | 9/2013 | Terech et al. |
| 8,575,518 B2 | 11/2013 | Walsh |
| 8,621,687 B2 | 1/2014 | Brykalski et al. |
| 8,732,874 B2 | 5/2014 | Brykalski et al. |
| 8,782,830 B2 | 7/2014 | Brykalski et al. |
| 8,893,329 B2 | 11/2014 | Petrovski et al. |
| 9,105,808 B2 | 8/2015 | Petrovski |
| 9,105,809 B2 | 8/2015 | Lofy |
| 9,121,414 B2 | 9/2015 | Lofy et al. |
| 9,125,497 B2 | 9/2015 | Brykalski et al. |
| 9,310,112 B2 | 4/2016 | Bell et al. |
| 9,335,073 B2 | 5/2016 | Lofy |
| 9,445,524 B2 | 9/2016 | Lofy et al. |
| 9,451,723 B2 | 9/2016 | Lofy et al. |
| 9,651,279 B2 | 5/2017 | Lofy |
| 9,662,962 B2 | 5/2017 | Steinman et al. |
| 9,685,599 B2 | 6/2017 | Petrovski et al. |
| 9,814,641 B2 | 11/2017 | Brykalski et al. |
| 9,857,107 B2 | 1/2018 | Inaba et al. |
| 9,989,267 B2 | 6/2018 | Brykalski et al. |
| 10,005,337 B2 | 6/2018 | Petrovski |
| 2001/0005990 A1 | 7/2001 | Kim et al. |
| 2001/0014212 A1 | 8/2001 | Rutherford |
| 2001/0028185 A1 | 10/2001 | Stowe et al. |
| 2002/0017102 A1 | 2/2002 | Bell |
| 2002/0026226 A1 | 2/2002 | Ein |
| 2002/0062854 A1 | 5/2002 | Sharp |
| 2002/0092308 A1 | 7/2002 | Bell |
| 2002/0100121 A1 | 8/2002 | Kocurek |
| 2002/0108380 A1 | 8/2002 | Nelsen et al. |
| 2002/0121094 A1 | 9/2002 | VanHoudt |
| 2002/0195844 A1 | 12/2002 | Hipwell |
| 2003/0019044 A1 | 1/2003 | Larsson et al. |
| 2003/0039298 A1 | 2/2003 | Eriksson et al. |
| 2003/0041892 A1 | 3/2003 | Fleurial et al. |
| 2003/0070235 A1 | 4/2003 | Suzuki et al. |
| 2003/0084511 A1 | 5/2003 | Salvatini et al. |
| 2003/0110779 A1 | 6/2003 | Otey et al. |
| 2003/0133492 A1 | 7/2003 | Watanabe |
| 2003/0145380 A1 | 8/2003 | Schmid |
| 2003/0150060 A1 | 8/2003 | Huang |
| 2003/0160479 A1 | 8/2003 | Minuth et al. |
| 2003/0188382 A1 | 10/2003 | Klamm et al. |
| 2003/0234247 A1 | 12/2003 | Stern |
| 2004/0090093 A1 | 5/2004 | Kamiya et al. |
| 2004/0098991 A1 | 5/2004 | Heyes |
| 2004/0113549 A1 | 6/2004 | Roberts et al. |
| 2004/0164594 A1 | 8/2004 | Stoewe et al. |
| 2004/0177622 A1 | 9/2004 | Harvie |
| 2004/0177876 A1 | 9/2004 | Hightower |
| 2004/0177877 A1 | 9/2004 | Hightower |
| 2004/0195870 A1 | 10/2004 | Bohlender |
| 2004/0238022 A1 | 12/2004 | Hiller et al. |
| 2004/0255364 A1 | 12/2004 | Feher |
| 2005/0011009 A1 | 1/2005 | Wu |
| 2005/0012204 A1 | 1/2005 | Strnad |
| 2005/0056310 A1 | 3/2005 | Shikata et al. |
| 2005/0067862 A1 | 3/2005 | Iqbal et al. |
| 2005/0072165 A1 | 4/2005 | Bell |
| 2005/0076944 A1 | 4/2005 | Kanatzidis et al. |
| 2005/0078451 A1 | 4/2005 | Sauciuc et al. |
| 2005/0086739 A1 | 4/2005 | Wu |
| 2005/0121065 A1 | 6/2005 | Otey |
| 2005/0126184 A1 | 6/2005 | Cauchy |
| 2005/0140180 A1 | 6/2005 | Hesch |
| 2005/0143797 A1 | 6/2005 | Parish et al. |
| 2005/0145285 A1 | 7/2005 | Extrand |
| 2005/0161072 A1 | 7/2005 | Esser et al. |
| 2005/0173950 A1 | 8/2005 | Bajic et al. |
| 2005/0200166 A1 | 9/2005 | Noh |
| 2005/0202774 A1 | 9/2005 | Lipke |
| 2005/0220167 A1 | 10/2005 | Kanai et al. |
| 2005/0251120 A1 | 11/2005 | Anderson et al. |
| 2005/0257532 A1 | 11/2005 | Ikeda et al. |
| 2005/0268956 A1 | 12/2005 | Take |
| 2005/0278863 A1 | 12/2005 | Bahash et al. |

(56) References Cited

U.S. PATENT DOCUMENTS

| | | |
|---|---|---|
| 2005/0285438 A1 | 12/2005 | Ishima et al. |
| 2005/0288749 A1 | 12/2005 | Lachenbruch |
| 2006/0005548 A1 | 1/2006 | Ruckstuhl |
| 2006/0005944 A1 | 1/2006 | Wang et al. |
| 2006/0053529 A1 | 3/2006 | Feher |
| 2006/0078319 A1 | 4/2006 | Maran |
| 2006/0080778 A1 | 4/2006 | Chambers |
| 2006/0087160 A1 | 4/2006 | Dong et al. |
| 2006/0102224 A1 | 5/2006 | Chen et al. |
| 2006/0118158 A1 | 6/2006 | Zhang et al. |
| 2006/0123799 A1 | 6/2006 | Tateyama et al. |
| 2006/0137099 A1 | 6/2006 | Feher |
| 2006/0137358 A1* | 6/2006 | Feher ............... B60N 2/5635 62/3.3 |
| 2006/0157102 A1 | 7/2006 | Nakajima et al. |
| 2006/0158011 A1 | 7/2006 | Marlovits et al. |
| 2006/0162074 A1 | 7/2006 | Bader |
| 2006/0175877 A1 | 8/2006 | Alionte et al. |
| 2006/0197363 A1 | 9/2006 | Lofy et al. |
| 2006/0200398 A1 | 9/2006 | Botton et al. |
| 2006/0201161 A1 | 9/2006 | Hirai et al. |
| 2006/0201162 A1 | 9/2006 | Hsieh |
| 2006/0214480 A1 | 9/2006 | Terech |
| 2006/0219699 A1 | 10/2006 | Geisel et al. |
| 2006/0225441 A1 | 10/2006 | Goenka et al. |
| 2006/0225773 A1 | 10/2006 | Venkatasubramanian et al. |
| 2006/0237166 A1 | 10/2006 | Otey et al. |
| 2006/0243317 A1 | 11/2006 | Venkatasubramanian |
| 2006/0244289 A1 | 11/2006 | Bedro |
| 2006/0273646 A1 | 12/2006 | Comiskey et al. |
| 2007/0017666 A1 | 1/2007 | Goenka et al. |
| 2007/0035162 A1 | 2/2007 | Bier et al. |
| 2007/0040421 A1 | 2/2007 | Zuzga et al. |
| 2007/0069554 A1 | 3/2007 | Comiskey et al. |
| 2007/0086757 A1 | 4/2007 | Feher |
| 2007/0095378 A1 | 5/2007 | Ito et al. |
| 2007/0095383 A1 | 5/2007 | Tajima |
| 2007/0101602 A1 | 5/2007 | Bae et al. |
| 2007/0107450 A1 | 5/2007 | Sasao et al. |
| 2007/0138844 A1 | 6/2007 | Kim |
| 2007/0142883 A1 | 6/2007 | Quincy, III |
| 2007/0145808 A1 | 6/2007 | Minuth et al. |
| 2007/0157630 A1 | 7/2007 | Kadle et al. |
| 2007/0158981 A1 | 7/2007 | Almasi et al. |
| 2007/0163269 A1 | 7/2007 | Chung et al. |
| 2007/0190712 A1 | 8/2007 | Lin et al. |
| 2007/0193279 A1 | 8/2007 | Yoneno et al. |
| 2007/0200398 A1 | 8/2007 | Wolas et al. |
| 2007/0214956 A1 | 9/2007 | Carlson et al. |
| 2007/0227158 A1 | 10/2007 | Kuchimachi |
| 2007/0234742 A1 | 10/2007 | Aoki et al. |
| 2007/0241592 A1 | 10/2007 | Giffin et al. |
| 2007/0251016 A1 | 11/2007 | Feher |
| 2007/0256722 A1 | 11/2007 | Kondoh |
| 2007/0261412 A1 | 11/2007 | Heine |
| 2007/0261413 A1 | 11/2007 | Hatannian et al. |
| 2007/0261548 A1 | 11/2007 | Vrzalik et al. |
| 2007/0262621 A1 | 11/2007 | Dong et al. |
| 2007/0296251 A1 | 12/2007 | Krobok et al. |
| 2008/0000025 A1 | 1/2008 | Feher |
| 2008/0022694 A1 | 1/2008 | Anderson et al. |
| 2008/0023056 A1 | 1/2008 | Kambe et al. |
| 2008/0028536 A1 | 2/2008 | Hadden-Cook |
| 2008/0028768 A1 | 2/2008 | Goenka |
| 2008/0028769 A1 | 2/2008 | Goenka |
| 2008/0053108 A1 | 3/2008 | Wen |
| 2008/0053509 A1 | 3/2008 | Flitsch et al. |
| 2008/0077211 A1 | 3/2008 | Levinson et al. |
| 2008/0078186 A1 | 4/2008 | Cao |
| 2008/0084095 A1 | 4/2008 | Wolas |
| 2008/0087316 A1 | 4/2008 | Inaba et al. |
| 2008/0154518 A1 | 6/2008 | Manaka et al. |
| 2008/0155990 A1 | 7/2008 | Gupta et al. |
| 2008/0163916 A1 | 7/2008 | Tsuneoka et al. |
| 2008/0164733 A1 | 7/2008 | Giffin et al. |
| 2008/0166224 A1 | 7/2008 | Giffin et al. |
| 2008/0245092 A1 | 10/2008 | Forsberg et al. |
| 2008/0263776 A1 | 10/2008 | O'Reagan |
| 2008/0289677 A1 | 11/2008 | Bell et al. |
| 2008/0307796 A1 | 12/2008 | Bell et al. |
| 2009/0000031 A1 | 1/2009 | Feher |
| 2009/0000310 A1 | 1/2009 | Bell et al. |
| 2009/0015042 A1 | 1/2009 | Bargheer et al. |
| 2009/0026813 A1 | 1/2009 | Lofy |
| 2009/0033130 A1 | 2/2009 | Marquette et al. |
| 2009/0106907 A1 | 4/2009 | Chambers |
| 2009/0108094 A1* | 4/2009 | Ivri ..................... A61L 9/127 239/101 |
| 2009/0126110 A1 | 5/2009 | Feher |
| 2009/0178700 A1 | 7/2009 | Heremans et al. |
| 2009/0211619 A1 | 8/2009 | Sharp et al. |
| 2009/0218855 A1 | 9/2009 | Wolas |
| 2009/0235969 A1 | 9/2009 | Heremans et al. |
| 2009/0269584 A1 | 10/2009 | Bell et al. |
| 2009/0293488 A1 | 12/2009 | Coughlan, III et al. |
| 2010/0132379 A1 | 6/2010 | Wu |
| 2010/0132380 A1 | 6/2010 | Robinson, II |
| 2010/0133883 A1 | 6/2010 | Walker |
| 2010/0153066 A1 | 6/2010 | Federer et al. |
| 2010/0154437 A1 | 6/2010 | Nepsha |
| 2010/0154911 A1 | 6/2010 | Yoskowitz |
| 2010/0198322 A1 | 8/2010 | Joseph |
| 2010/0307168 A1 | 12/2010 | Kohl et al. |
| 2011/0066217 A1 | 3/2011 | Diller et al. |
| 2011/0101741 A1 | 5/2011 | Kolich |
| 2011/0271994 A1 | 11/2011 | Gilley |
| 2011/0289684 A1 | 12/2011 | Parish et al. |
| 2012/0003510 A1 | 1/2012 | Eisenhour |
| 2012/0017371 A1 | 1/2012 | Pollard |
| 2012/0080911 A1 | 4/2012 | Brykalski et al. |
| 2012/0235444 A1 | 9/2012 | Dilley et al. |
| 2012/0239123 A1 | 9/2012 | Weber et al. |
| 2012/0261399 A1 | 10/2012 | Lofy |
| 2012/0289761 A1 | 11/2012 | Boyden et al. |
| 2013/0086923 A1 | 4/2013 | Petrovski et al. |
| 2013/0097776 A1 | 4/2013 | Brykalski et al. |
| 2013/0097777 A1 | 4/2013 | Marquette et al. |
| 2013/0125563 A1 | 5/2013 | Jun |
| 2013/0206852 A1 | 8/2013 | Brykalski et al. |
| 2013/0232996 A1 | 9/2013 | Goenka et al. |
| 2013/0239592 A1 | 9/2013 | Lofy |
| 2014/0007594 A1 | 1/2014 | Lofy |
| 2014/0026320 A1 | 1/2014 | Marquette et al. |
| 2014/0030082 A1 | 1/2014 | Helmenstein |
| 2014/0062392 A1 | 3/2014 | Lofy et al. |
| 2014/0090513 A1 | 4/2014 | Zhang et al. |
| 2014/0090829 A1 | 4/2014 | Petrovski |
| 2014/0113536 A1 | 4/2014 | Goenka et al. |
| 2014/0131343 A1 | 5/2014 | Walsh |
| 2014/0137569 A1 | 5/2014 | Parish et al. |
| 2014/0159442 A1 | 6/2014 | Helmenstein |
| 2014/0180493 A1 | 6/2014 | Csonti et al. |
| 2014/0187140 A1 | 7/2014 | Lazanja et al. |
| 2014/0194959 A1 | 7/2014 | Fries et al. |
| 2014/0237719 A1 | 8/2014 | Brykalski et al. |
| 2014/0250918 A1 | 9/2014 | Lofy |
| 2014/0256244 A1 | 9/2014 | Sakurai et al. |
| 2014/0260331 A1 | 9/2014 | Lofy et al. |
| 2014/0305625 A1 | 10/2014 | Petrovski |
| 2014/0310874 A1 | 10/2014 | Brykalski et al. |
| 2014/0338366 A1 | 11/2014 | Adldinger et al. |
| 2015/0013346 A1 | 1/2015 | Lofy |
| 2015/0121902 A1 | 5/2015 | Steinman et al. |
| 2015/0176870 A1 | 6/2015 | Inaba et al. |
| 2015/0238020 A1 | 8/2015 | Petrovski et al. |
| 2016/0030234 A1 | 2/2016 | Lofy et al. |
| 2016/0053772 A1 | 2/2016 | Lofy et al. |
| 2016/0137110 A1 | 5/2016 | Lofy et al. |
| 2017/0071359 A1 | 3/2017 | Petrovski et al. |
| 2017/0284710 A1 | 10/2017 | Petrovski et al. |
| 2017/0291467 A1 | 10/2017 | Steinman et al. |

(56) References Cited

U.S. PATENT DOCUMENTS

| | | | |
|---|---|---|---|
| 2018/0172325 A1 | 6/2018 | Inaba et al. | |
| 2018/0213942 A1 | 8/2018 | Marquette et al. | |

FOREIGN PATENT DOCUMENTS

| | | |
|---|---|---|
| CN | 1299950 | 6/2001 |
| CN | 1320087 | 10/2001 |
| CN | 1929761 | 3/2007 |
| CN | 101 219 025 | 7/2008 |
| DE | 195 03 291 | 8/1996 |
| DE | 199 12 764 | 9/2000 |
| DE | 101 15 242 | 10/2000 |
| DE | 299 11 519 | 11/2000 |
| DE | 102 38 552 | 8/2001 |
| DE | 201 20 516 | 4/2003 |
| DE | 10 2009 036 332 | 2/2011 |
| EP | 0 424 160 | 4/1991 |
| EP | 0 411 375 | 5/1994 |
| EP | 0 621 026 | 10/1994 |
| EP | 0 834 421 | 4/1998 |
| EP | 0 862 901 | 9/1998 |
| EP | 1 598 223 | 11/2005 |
| EP | 1 972 312 | 9/2008 |
| EP | 1 845 914 | 9/2009 |
| EP | 2 073 669 | 11/2012 |
| EP | 2 921 083 | 9/2015 |
| FR | 2 893 826 | 6/2007 |
| GB | 874660 | 8/1961 |
| GB | 978057 | 12/1964 |
| JP | 56-097416 | 8/1981 |
| JP | 60-080044 | 5/1985 |
| JP | 60-085297 | 5/1985 |
| JP | 01-281344 | 11/1989 |
| JP | 04-522470 | 6/1990 |
| JP | 04-165234 | 6/1992 |
| JP | 05-026762 | 2/1993 |
| JP | 05-277020 | 10/1993 |
| JP | 10-044756 | 2/1998 |
| JP | 10-227508 | 8/1998 |
| JP | 10-297243 | 11/1998 |
| JP | 10-3328583 | 12/1998 |
| JP | 2000-060681 | 2/2000 |
| JP | 2000-164945 | 6/2000 |
| JP | 2001-174028 | 6/2001 |
| JP | 2001-208405 | 8/2001 |
| JP | 2002-514735 | 5/2002 |
| JP | 2002-227798 | 8/2002 |
| JP | 2003-204087 | 7/2003 |
| JP | 2003-254636 | 9/2003 |
| JP | 2004-055621 | 2/2004 |
| JP | 2004-174138 | 6/2004 |
| JP | 2005-079210 | 2/2005 |
| JP | 2005-333083 | 12/2005 |
| JP | 2006-001392 | 1/2006 |
| JP | 2006-021572 | 1/2006 |
| JP | 2006-076398 | 3/2006 |
| KR | 2001-0060500 | 7/2001 |
| KR | 10-2005-0011494 | 1/2005 |
| LU | 66619 | 2/1973 |
| WO | WO 94/020801 | 9/1994 |
| WO | WO 95/014899 | 6/1995 |
| WO | WO 95/0316888 | 11/1995 |
| WO | WO 96/005475 | 2/1996 |
| WO | WO 98/007898 | 2/1998 |
| WO | WO 98/0031311 | 7/1998 |
| WO | WO 99/023980 | 5/1999 |
| WO | WO 99/044552 | 9/1999 |
| WO | WO 99/058907 | 11/1999 |
| WO | WO 02/011968 | 2/2002 |
| WO | WO 02/053400 | 7/2002 |
| WO | WO 02/058165 | 7/2002 |
| WO | WO 03/014634 | 2/2003 |
| WO | WO 03/051666 | 6/2003 |
| WO | WO 03/063257 | 7/2003 |
| WO | WO 2004/011861 | 2/2004 |
| WO | WO 2005/115794 | 12/2005 |
| WO | WO 2006/078394 | 7/2006 |
| WO | WO 2007/060371 | 5/2007 |
| WO | WO 2007/089789 | 8/2007 |
| WO | WO 2008/045964 | 4/2008 |
| WO | WO 2008/046110 | 4/2008 |
| WO | WO 2008/057962 | 5/2008 |
| WO | WO 2008/076588 | 6/2008 |
| WO | WO 2008/086499 | 7/2008 |
| WO | WO 2008/115831 | 9/2008 |
| WO | WO 2009/015235 | 1/2009 |
| WO | WO 2009/036077 | 3/2009 |
| WO | WO 2009/097572 | 8/2009 |
| WO | WO 2010/009422 | 1/2010 |
| WO | WO 2010/088405 | 8/2010 |
| WO | WO 2010/129803 | 11/2010 |
| WO | WO 2011/026040 | 3/2011 |
| WO | WO 2011/156643 | 12/2011 |
| WO | WO 2012/061777 | 5/2012 |
| WO | WO 2013/052823 | 4/2013 |
| WO | WO 2014/164887 | 10/2014 |

OTHER PUBLICATIONS

Lofy et al., "Thermoelectrics for Environmental Control in Automobiles", Proceeding of Twenty-First International Conference on Thermoelectrics (ICT 2002), 2002, pp. 471-476.
Photographs and accompanying description of climate control seat assembly system components publicly disclosed as early as Jan. 1998.
Photographs and accompanying description of a component of a climate control seat assembly system sold prior to Nov. 1, 2005.
Photographs and accompanying description of a component of a climate control seat assembly system sold prior to Dec. 20, 2003.
European Search Report in European Application No. 09706444.8, dated Apr. 6, 2011.
International Search Report received in PCT Application No. PCT/US2009/032717, dated Mar. 16, 2009.
Japanese Office Action re JP Patent Application No. 2011-518941, dated Oct. 18, 2013, along with its English translation as translated by a foreign associate.
U.S. Appl. No. 15/467,830, filed Mar. 23, 2017, Brykalski et al.
U.S. Appl. No. 15/495,797, filed Apr. 24, 2017, Steinman et al.
International Search Report and Written Opinion received in PCT Application No. PCT/US2009/032717, dated Mar. 16, 2009.
International Preliminary Report on Patentability received in PCT Application No. PCT/US2009/032717, dated Aug. 12, 2010.
U.S. Appl. No. 15/627,098, filed Jun. 19, 2017, Petrovski et al.
U.S. Appl. No. 15/685,912, filed Aug. 24, 2017, Petrovski et al.
U.S. Appl. No. 14/821,514, filed Aug. 7, 2015, Lofy.
U.S. Appl. No. 15/842,535, filed Dec. 14, 2017, Inaba et al.
U.S. Appl. No. 15/880,433, filed Jan. 25, 2018, Marquette et al.
Luo, Zhaoxia, "A Simple Method to Estimate the Physical Characteristics of a Thermoelectric Cooler from Vendor Datasheets", Electronics Cooling, Aug. 2008, in 17 pages from https://www.electronics-cooling.com/2008/08/a-simple-method-to-estimate-the-physical-characteristics-of-a-thermoelectric-cooler-from-vendor-datasheets/.
U.S. Appl. No. 15/994,275, filed May 31, 2018, Brykalski et al.

* cited by examiner

CONDENSATION AND HUMIDITY SENSORS FOR THERMOELECTRIC DEVICES

CROSS-REFERENCE TO RELATED APPLICATIONS

This application is a continuation of U.S. patent application Ser. No. 14/307,988, filed Jun. 18, 2014, which is a continuation of U.S. patent application Ser. No. 13/963,216, filed Aug. 9, 2013, which is continuation of U.S. patent application Ser. No. 13/599,896, filed Aug. 30, 2012 and issued as U.S. Pat. No. 8,505,320, which is a continuation of U.S. patent application Ser. No. 12/364,285, filed Feb. 2, 2009 and issued as U.S. Pat. No. 8,256,236 on Sep. 4, 2012, which claims the priority benefit under 35 U.S.C. § 119(e) of U.S. Provisional Patent Application No. 61/025,694, filed Feb. 1, 2008, and U.S. Provisional Patent Application No. 61/025,719, filed Feb. 1, 2008, the entireties of U.S. application Ser. No. 12/364,285, filed Feb. 2, 2009, U.S. Provisional Patent Application No. 61/025,694, filed Feb. 1, 2008, and U.S. Provisional Patent Application No. 61/025,719, filed Feb. 1, 2008 are hereby incorporated by reference herein.

BACKGROUND

Field of the Inventions

This application relates generally to climate control, and more specifically, to climate control of seating assemblies utilizing a thermoelectric circuit.

Description of the Related Art

Temperature modified air for environmental control of living or working space is typically provided to relatively extensive areas, such as entire buildings, selected offices, or suites of rooms within a building. In the case of vehicles, such as automobiles, the entire vehicle is typically cooled or heated as a unit. There are many situations, however, in which more selective or restrictive air temperature modification is desirable. For example, it is often desirable to provide individualized climate control for an occupant seat so that substantially instantaneous heating or cooling can be achieved. For example, an automotive vehicle exposed to the summer weather, especially where the vehicle has been parked in an unshaded area for a long period of time, can cause the vehicle seat to be very hot and uncomfortable for the occupant for some time after entering and using the vehicle, even with normal air conditioning. Furthermore, even with normal air-conditioning, on a hot day, the seat occupant's back and other pressure points may remain sweaty while seated. In the winter time, it may be desirable to quickly warm the seat of the occupant in order to enhance an occupant's comfort. This is particularly true where a typical vehicle heater is unlikely to quickly warm the vehicle's interior. For these and other reasons, there have long been various types of individualized climate control systems for vehicle seats. More recently, individualized climate control systems have been extended to beds, chairs, wheelchairs, other medical beds or chairs and the like.

Such climate control systems typically include a distribution system comprising a combination of channels and passages formed in one or more cushions of a seat. Climate conditioned air can be supplied to these channels and passages by using a climate controlled device. Climate conditioned air flows through the channels and passages to cool or heat the space adjacent the surface of the vehicle seat.

There are, however, problems that have been experienced with existing climate control systems. For example, some control systems utilize thermoelectric devices (TEDs) that can have a variety of configurations on the hot and main sides of the device. For configurations in which there is a heat exchanger on the main side with air flowing past it, condensation may form from water in the air. Whether or not condensation will occur and how much condensation will occur depends on the ambient air conditions (i.e. temperature and relative humidity) and the amount of temperature reduction from the inlet of the main side heat exchanger to the outlet. This condensation often can have undesirable consequences, from corrosion on metal parts to the creation of mold. Condensation may also partially or totally block airflow at the fin passages on the main side of the TED, resulting in reduction or loss of function.

SUMMARY

According to certain embodiments disclosed in the present application, a climate controlled seating assembly includes a thermal module. The thermal module comprises at least one inlet channel, at least one outlet channel and a thermoelectric device (e.g., Peltier circuit) positioned upstream of the outlet channel. According to some arrangements, the thermoelectric device is configured to selectively heat or cool a fluid passing through an interior of the thermal module. The climate controlled seating assembly additionally includes a fluid transfer device, such as a fan or blower, that is configured to transfer a fluid from the inlet channel to the outlet channel of the thermal module, past the thermoelectric device. In one embodiment, the seating assembly further includes a sensor positioned within an interior of the thermal module and configured to detect the presence of a liquid, such as water, condensation or other fluids, on or near said sensor. In certain arrangements, the sensor is configured to detect the presence of a liquid by measuring an electrical resistance or capacitance across a portion of the sensor. Alternatively, the sensor can detect the presence of a liquid using any other method.

According to some embodiments, the sensor comprises at least first and second conductive members (e.g., electrical traces). In one embodiment, the sensor is configured to measure the electrical resistance or capacitance across the traces or other conductive members. In another configuration, the sensor is positioned on the thermoelectric device or along a cooling side of the thermoelectric device. In some embodiments, the sensor is positioned along the outlet channel that is adapted to receive a fluid (e.g., air) cooled by the thermoelectric device.

In other arrangements, the first conductive member and/or the second conductive member are etched onto a substrate of the thermoelectric device. In another configuration, the substrate comprises polyimide, epoxy, ceramic or any other suitable material. In other embodiments, a voltage supplied to the thermoelectric device is configured to be reduced if the presence of a liquid is detected by the sensor. According to other arrangements, the seating assembly comprises an automobile or other type of vehicle seat, a bed, a wheelchair, a sofa, an office chair, a medical bed and/or the like.

In accordance with certain embodiments of the present application, a method of controlling a thermoelectric device configured for use in a climate controlled seat assembly includes providing a fluid module adapted to provide heated or cooled air to the climate controlled seat assembly. In some arrangements, the fluid module includes a thermoelectric device configured to selectively heat or cool air passing through an interior of the fluid module and a fluid transfer device (e.g., fan, blower, etc.) configured to transfer air through the interior of the fluid module, past the thermoelectric device. The method additionally includes positioning a sensor within the fluid module, wherein the sensor is configured to detect condensates and/or other liquids with which it comes into contact. Further, the method includes directing a first voltage to the thermoelectric device to selectively heat or cool air being transferred through fluid module. In some embodiments, a second voltage, which is less than the first voltage, is directed to the thermoelectric device when the sensor detects condensates and/or other liquids.

In certain arrangements, the sensor is configured to detect condensates and/or other liquids by measuring an electrical resistance or capacitance across a portion of the sensor. In some embodiments, the sensor positively detects condensates and/or other liquids when the electrical resistance or capacitance across it changes by at least 2%, 5%, 10%, 20% or more than 20% over a 1-minute, 2-minute, 5-minute, 10-minute or 15-minute time period (or time periods less than 1 minute, greater than 15 minutes and/or any other time period. In some embodiments, the second voltage is zero so that no current is supplied to the thermoelectric device. Thus, the thermoelectric device can be deactivated when the sensor detects condensate and/or other liquids. In another arrangement, the sensor is positioned on the thermoelectric device or along a cooling side of the thermoelectric device. In other embodiments, the sensor is positioned along an outlet of the fluid module positioned generally downstream of the thermoelectric device. The outlet can be configured to receive air which has been cooled by the thermoelectric device.

According to another embodiment, a fluid conditioning device for use with a climate controlled seating assembly includes a fluid module comprising a housing, a fluid transfer device configured to convey a fluid through an interior of the housing, and a thermoelectric device configured to selectively heat or cool fluids passing within the interior of the housing. The thermoelectric device can comprise a hot side and a cold side, with the hot side being in fluid communication with a hot passage and the cold side being in fluid communication with a cold passage. In some arrangements, the hot passage is configured to receive air heated by the thermoelectric device and the cold passage is configured to receive air cooled by the thermoelectric device. The hot and cold passages are located downstream of the thermoelectric device and within the housing of the fluid module. The fluid condition device further includes a separator gasket located within the housing and at least partially between the cold passage and the hot passage. In some embodiments, the separator gasket comprises one or more wicking materials. The separator gasket can be configured to transport liquids from the cold passage to the hot passage.

In some embodiments, the separator gasket comprises a porous structure. In other arrangements, the wicking material comprises polypropylene, nylon and/or any other material or configuration. In other arrangements, liquids transported to the hot passage are configured to be evaporated. In another embodiment, the fluid conditioning device additionally includes at least one finger of wicking material that extends at least partially through the housing to the thermoelectric device. The finger of wicking material can be configured to transport liquids from the thermoelectric device to the separator gasket.

According to certain embodiments of the present application, a method of automatically regulating a climate controlled seating assembly using an automated control scheme includes providing a fluid module that is in fluid communication with at least one fluid distribution channel of the seating assembly. In some embodiments, the fluid module comprises a thermoelectric device configured to selectively heat or cool fluids passing through the fluid module and a fluid transfer device configured to transfer fluids through the fluid module. The fluid transfer device includes an inlet and an outlet. The method of automatically regulating a seating assembly additionally includes detecting a temperature of fluid exiting the outlet of the fluid transfer device, detecting a relative humidity of fluid exiting the outlet of the fluid transfer device and providing the temperature and the relative humidity as inputs into a control scheme protocol. Further, the method comprises modifying an operational parameter of the thermoelectric device and/or the fluid transfer device based on instructions provided by the control scheme protocol.

In some embodiments, the seating assembly comprises an automobile seat, another vehicle seat, a bed, a wheelchair, an office chair, a sofa, a medical bed and/or the like. In some embodiments, the method also includes detecting a temperature of ambient air. The control scheme protocol can be configured to receive the temperature of ambient air as an input. In other arrangements, the method also includes detecting a presence of an occupant positioned on the seating assembly using an occupant detection sensor. In one embodiment, modifying an operational parameter comprises adjusting a voltage or current supplied to the thermoelectric device, adjusting the speed of the fluid transfer device and/or the like.

In some configurations a thermoelectric device can comprise a Peltier circuit and a sensor which determines the presence of a fluid at the sensor by measuring a change in either resistance or capacitance. The voltage to the thermoelectric device can be decreased or eliminated completely when the sensor measures such a change in resistance or capacitance. The fluid may be water or condensation formed within a climate controlled system.

In some embodiments the thermoelectric device comprises a ledge which projects past the Peltier circuit wherein part of or the entire sensor is located on the ledge. The ledge may comprise a substrate. The substrate may be formed of copper.

In some embodiments the sensor is on a main side of the thermoelectric device.

A thermoelectric device may comprise a Peltier circuit, at least one fin and a sensor which determines the presence of water at the sensor by measuring a change in either resistance or capacitance. The sensor may be downstream of the at least one fin.

A sensor to detect the presence of a fluid at the sensor may comprise one or more conductive traces. Where the sensor comprises two or more conductive traces, the traces may be maintained at substantially equal spacing apart from each other. The sensor may measure a change in resistance across the two traces. The change in resistance may be an absolute change or a rapid change over a short period of time. Where the sensor comprises one trace the sensor may further comprise a conductive surface. The conductive surface may comprise a heat transfer member such at least one fin. The sensor may measure a change in resistance across the trace and the heat transfer member.

In some embodiments the trace is (are) etched onto a substrate. The substrate may comprise polyimide.

A sensor to detect the presence of a fluid at the sensor may also measure capacitance instead of resistance. A sensor may comprise a first and second conductive plate and a material that absorbs water inbetween the first and second conductive plates. In some embodiments the material inbetween comprises polyimide and the first and second conductive plates may comprise copper.

In some embodiments the first conductive plate may comprise electrical joining tabs that are part of the TED. The second conductive plate may comprise a thermal conductive element, also part of the TED. The material inbetween may comprise a substrate which is also part of the TED.

In some embodiments of a sensor that uses capacitance to detect the presence of a fluid, the second conductive plate comprises at least one hole etched into the surface of the plate to increase the surface area of the material inbetween that is exposed to absorption of the fluid. The hole(s) may be located generally across the substrate or they may be located at a spot of high likelihood of condensation formation.

A climate conditioned vehicle seat may comprise a fluid distribution system, and a fluid module, comprising a fluid transfer device, a thermoelectric device and a sensor which determines the presence of water at the sensor by measuring a change in either resistance or capacitance. The climate conditioned vehicle seat may further comprise a voltage reduction to the thermoelectric device when the sensor measures a change in resistance or capacitance.

A climate conditioned bed may comprise a fluid distribution system, and a fluid module, comprising a fluid transfer device, a thermoelectric device and a sensor which determines the presence of water at the sensor by measuring a change in either resistance or capacitance. The climate conditioned bed may further comprise a voltage reduction to the thermoelectric device when the sensor measures a change in resistance or capacitance.

One configuration of a TED assembly has fins on both sides of the TED and air blowing past both sides. Downstream of the fins, it is often desired to have the hot and cold airstreams separated from each other so that the conditioned air can be used for a functional purpose. One method of doing this is to place a piece of foam in between the hot and cold fins that will physically separate the airstreams and also act as a thermal barrier between them (e.g. to prevent the hot air from heating up the cooled air).

One embodiment of the invention replaces this (typically foam) separator gasket with a wicking separator gasket. If condensation does occur on the cold side airflow, the water formed will wick across the separator gasket to the other side (with hot air flowing past it) and be evaporated and carried away by the hot air. In this manner, the condensation formed is removed from the cold side of the TED.

For conditions in which water condenses on the cold side of a TED assembly, the wicking separator gasket will remove the condensed liquid.

This allows TED assemblies to be designed with higher thermal performance than would otherwise be achievable. In other words, the TED can be designed to provide a higher change in temperature on the cold side air stream. Alternately, the TED can be operated in high humidity ambient environments.

In another embodiment, finger wicks can extend between the cold side fins of a TED and lead to a hot side of the airstream. The fingers wick can draw moisture away from the fins and to the hot side of the airstream; this moisture can then be evaporated into the hot air.

BRIEF DESCRIPTION OF THE DRAWINGS

These and other features, aspects and advantages of the present inventions are described herein in connection with certain preferred embodiments, in reference to the accompanying drawings. The illustrated embodiments, however, are merely examples and are not intended to limit the inventions. The drawings include the following figures.

DETAILED DESCRIPTION OF THE PREFERRED EMBODIMENTS

A variety of examples described below illustrate various configurations that may be employed to achieve desired improvements. The particular embodiments and examples are only illustrative and not intended in any way to restrict the general inventions presented and the various aspects and features of these inventions. In addition, it should be understood that the terms cooling side, heating side, main side, waste side, cooler side and hotter side and the like do not indicate any particular temperature, but are relative terms. For example, the "hot," "heating" or "hotter" side of a thermoelectric device or array may be at ambient temperature, with the "cold," "cooling" or "cooler" side at a cooler temperature than ambient. Conversely, the "cold," "cooling" or "cooler" side may be at ambient with the "hot," "heating" or "hotter" side at a higher temperature than ambient. Thus, the terms are relative to each other to indicate that one side of the thermoelectric device is at a higher or lower temperature than the counter or opposing side. Moreover, as is known in the art, when the electrical current in a thermoelectric device is reversed, heat can be transferred to the "cold" side of the device, while heat is drawn from the "hot" side of the device. In addition, fluid flow is referenced in the discussion below as having directions. When such references are made, they generally refer to the direction as depicted in the two dimensional figures. The terminology indicating "away" from or "along" or any other fluid flow direction described in the application is meant to be an illustrative generalization of the direction of flow as considered from the perspective of two dimensional figures.

Figure 1:
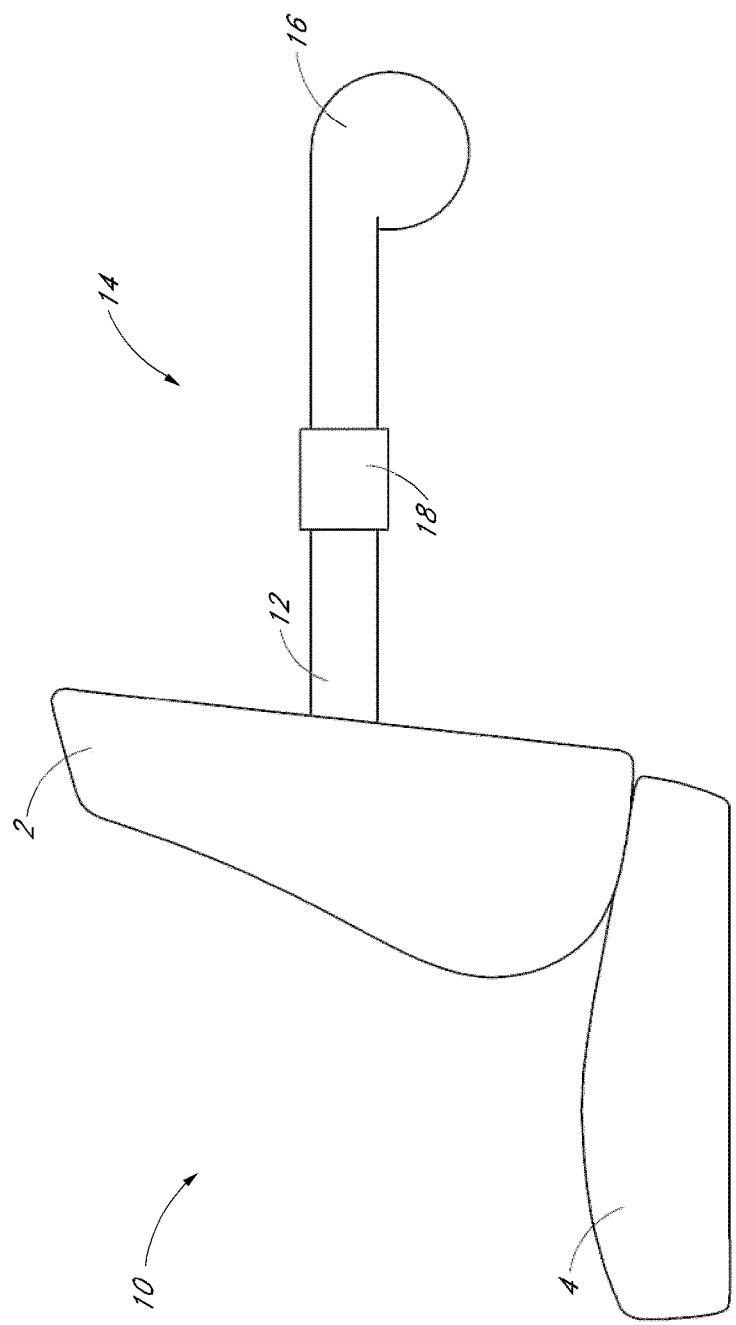
FIG. 1 illustrates a side schematic view of a climate controlled vehicle seat according to one embodiment.

FIG. 1 is a schematic diagram of a climate controlled vehicle seat 10. The depicted climate controlled vehicle seat 10 includes a seat back 2, a seat bottom 4, a fluid distribution system 12 and a fluid module 14. The terms "fluid module" and "thermal module" are used interchangeably herein. The fluid module 14 can include a fluid transfer device 16 and a thermoelectric device (TED) 18. The fluid transfer device 16 comprises, for example, a blower or a fan. FIG. 1 illustrates one embodiment of a climate controlled vehicle seat 10 wherein air or other fluids, which are thermally conditioned by the fluid module 14, can be selectively transferred from the fluid module 14, through the fluid distribution system 12 and toward a occupant positioned on the vehicle seat 10. While components of the fluid module 14 (e.g., the TED 18, fluid transfer device 16, the distribution system 12) are illustrated outside the seat 10, one or more of these components can be positioned entirely or partially within the seat 10, as desired or required.

As illustrated in FIG. 1, the seat assembly 10 can be similar to a standard automotive seat. However, it should be appreciated that certain features and aspects of the seat assembly 10 described herein may also be used in a variety of other applications and environments. For example, certain features and aspects of the seat assembly 10 may be adapted for use in other vehicles, such as, for example, airplanes, trains, boats and/or the like. In other arrangements, as discussed in greater detail herein, the seat assembly can include a bed (FIG. 2), a medical bed, a chair, a couch, a wheelchair, another medical bed or chair and/or any other device configured to support one or more occupants.

Figure 2:
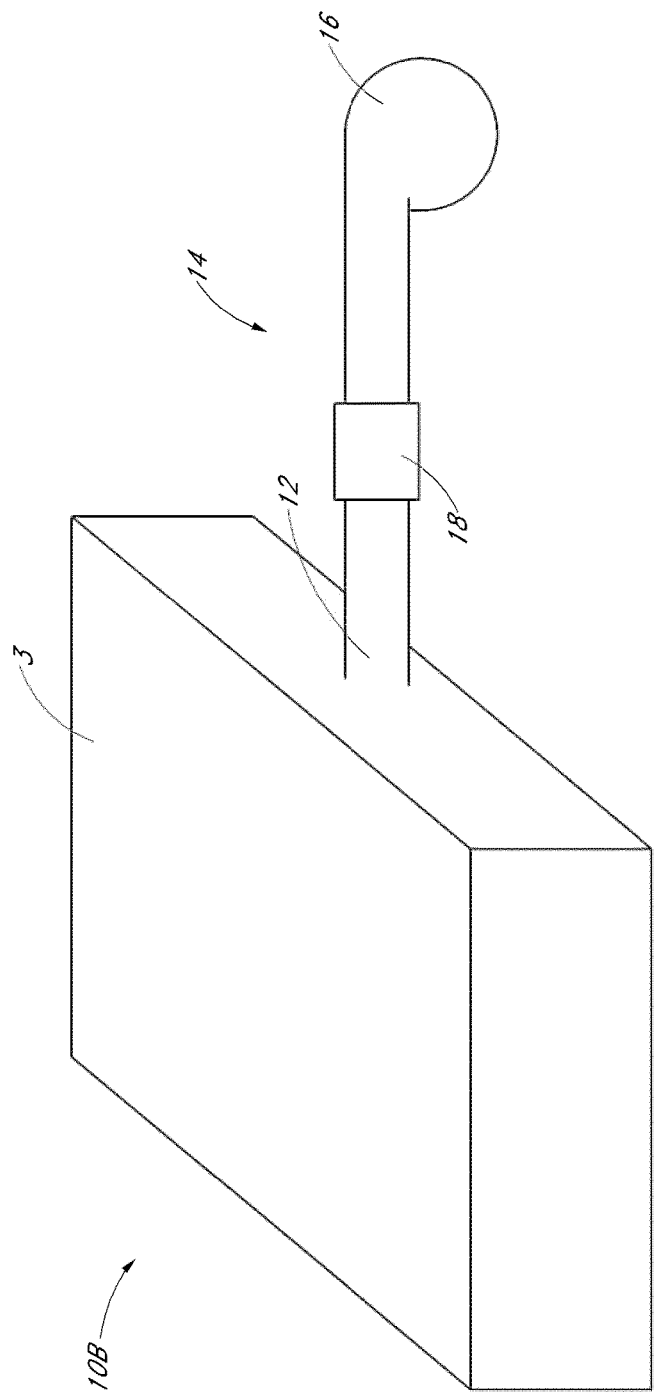
FIG. 2 illustrates a perspective schematic view of a climate controlled bed according to one embodiment.

For instance, FIG. 2 illustrates a schematic diagram of a climate controlled bed 10B. The depicted arrangement of a climate controlled bed 10B includes a cushion 3, a fluid distribution system 12 and a fluid module 14. The fluid module 14 can include a fluid transfer device 16 (e.g., a fan, blower, etc.), a TED 18 and any other devices or components (e.g., sensors), as desired or required. FIG. 2 illustrates only one configuration of a climate controlled bed 10B wherein the fluid module 14 is conditioned and transferred from the fluid module 14, through the fluid distribution system 12 to the ultimate user sitting or lying on the bed 10B.

With continued reference to FIG. 2, the bed assembly 10B can be similar to a standard bed. However, one or more features and aspects of the bed assembly 10B described herein may also be used in a variety of other applications and environments. For example, certain features and aspects of the bed assembly 10B may be adapted for use in other stationary environments, such as, for example, a chair, a sofa, a theater seat, and an office seat that is used in a place of business and/or residence.

Figure 3:
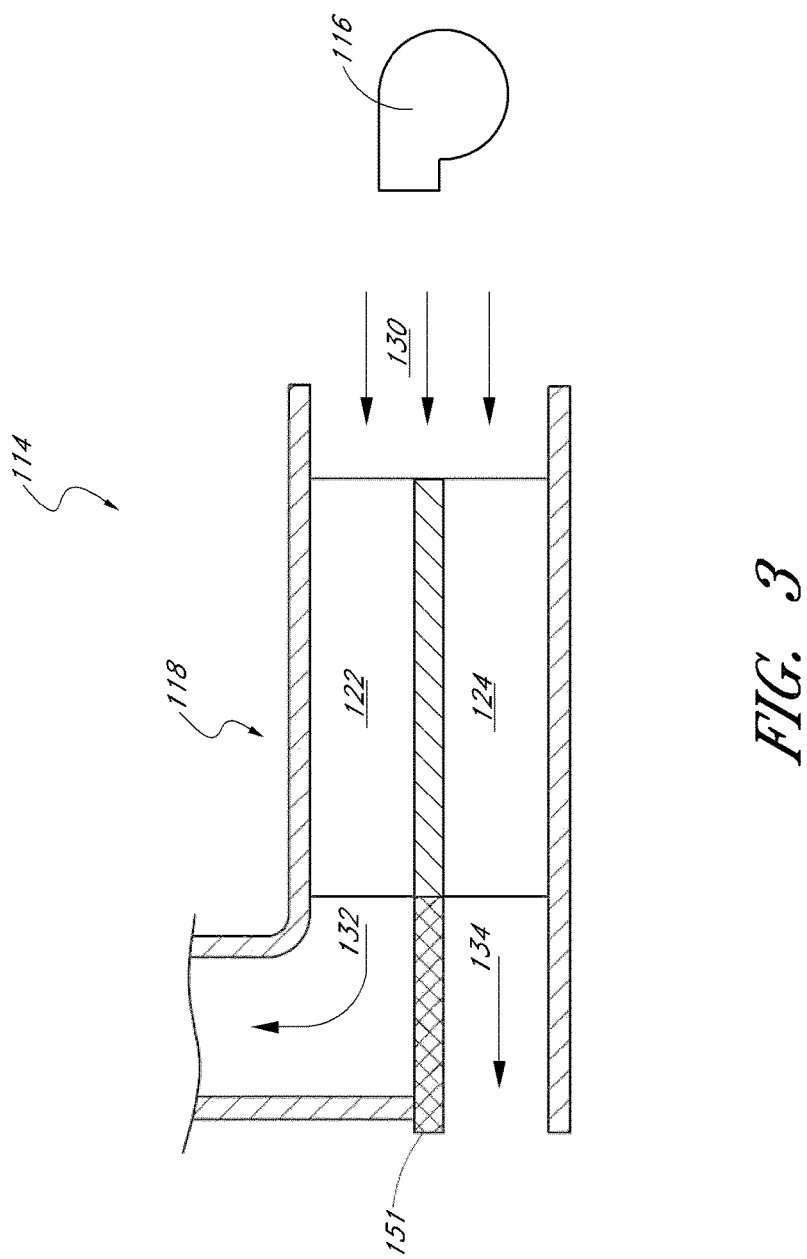
FIG. 3 illustrates a partial cross-sectional view of a fluid module according to one embodiment.

With reference to FIG. 3, a fluid transfer device 116 of a fluid module 114 can be configured to provide a fluid, usually air, to an inlet 130 of a TED 118. As discussed in greater detail herein, the TED can include a hot side 124 and a cold side 122. Fluids being directed through the fluid module 114 are generally divided between the hot side 124 and the cold side 122. From the cold side 122 of the TED 118, fluids leave via a cold side outlet 132 that leads to the fluid distribution system 112 of a seat assembly. On the other hand, from the hot side 124 of the TED 18, fluids leave via a hot side outlet 134 that may be in fluid communication with a waste duct. Such a waste duct can convey the fluids to an area where they will not affect the user of the conditioning system or the operation of the conditioning system itself.

According to certain arrangements, fluids are selectively thermally-conditioned as they pass through or near the TED 118. Thus, fluids leaving the TED 118 through the cold side outlet 132 are relatively cold, and fluids leaving the TED 118 through the hot side outlet 134 are relatively warm. Further, a separator gasket 151 can be generally positioned between the cold side outlet 132 and the hot side outlet 134. The separator gasket 151 can comprise a foam (e.g., closed cell, open cell, etc.) and/or any other material. In certain arrangements, the separator gasket 151 is used to both separate the hot and cold fluid flows and to thermally isolate them.

Condensate Wicking

With continued reference to FIG. 3, problems may arise when the change in temperature on the cold side 122 of a TED rises above the dew point. For example, this can cause condensation to form. The condensation may form, for example, within the TED 18, in the cold side outlet 132 and/or at any other location within or near the TED 118 or the fluid module 114.

Condensation formed within a fluid module can cause a number of potential problems. For example, a plurality of fins can be provided along the cold side 122 and/or the hot side 124 of a TED 118 to help transfer heat to or from air or other fluids passing through a fluid module 114. Based on the temperature variations within a TED, condensation can form on the fins, generally decreasing the effective surface area of the fins. Consequently, the flow of air or other fluids through the cold side 122 of the TED 118 can be partially or completely impeded. Under such conditions, the temperature on the cold side 122 may decrease to the point where ice forms within the TED 118 and/or along the cold side outlet 132. Ice formation may further limit fluid flow through the fluid module 114, and thus, may undesirably prevent the thermal conditioning system from functioning properly.

Additionally, as condensation forms it may pool or otherwise collect on or within the TED 118 and/or other portions of the thermal module 114. In some embodiments, condensed water or other fluid can move to other downstream locations of the seat assembly where it can cause further problems. For example, such condensate can be transferred to the fluid distribution system and/or the cushion of a seat assembly. As a result, mold, rust, oxidation, moisture damage, stains and/or other problems may result. The condensate may also decrease the comfort level of the user. For example, under some conditions, moist or wet air may be blown on a user's legs, back and/or other portions of an occupant's body. Further, the condensate may create odor problems within the automobile, room or other location where the seat assembly is located.

Figure 4A:
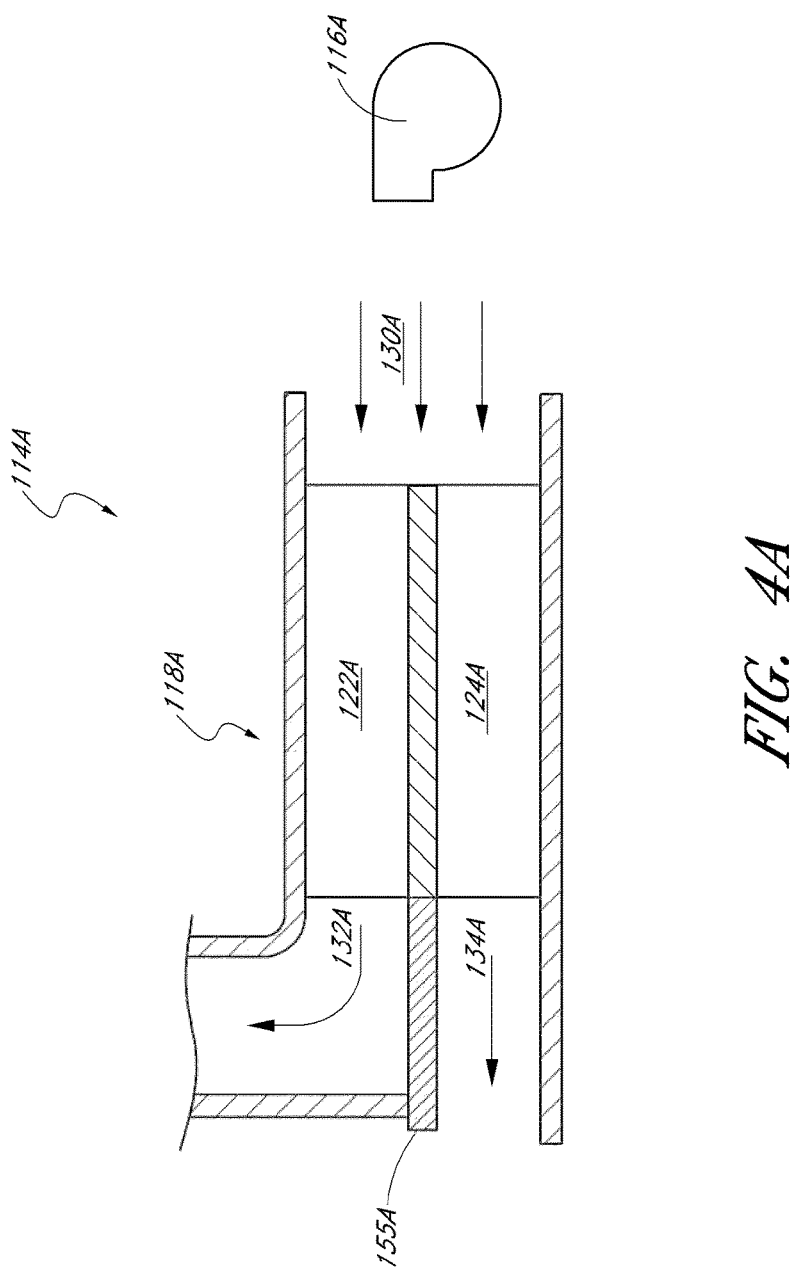
FIG. 4A illustrates a partial cross-sectional view of a fluid module comprising a wicking separator gasket according to one embodiment.

FIG. 4A illustrates one embodiment adapted to address the condensate formation and pooling problems discussed herein. In the depicted arrangement, the fluid module 114A comprises, inter alia, a fluid transfer device 116A and a TED 118A. As shown, the TED 118A can be located downstream of a fan or other fluid transfer device 116A. However, in any of the embodiments disclosed herein, a TED can be alternatively located upstream of a fluid transfer device, as desired or required. The fluid transfer device 116A can be adapted to transfer air or other fluids to an inlet 130A of the TED 118A. In some arrangements, the TED 118A includes a hot side 124A and a cold side 122A. Thus, fluid flow can be selectively advanced through the inlet 130A and into the TED 118A, where the fluid can be divided between the hot side 124A and the cold side 122A. From the cold side 122A of the TED 118A, the fluid leaves via a cold side outlet 132A that leads to the fluid distribution system 112A. Likewise, from the hot side 124A of the TED 118A, the fluid leaves via a hot side outlet 134A toward a waste duct.

Figure 4B:
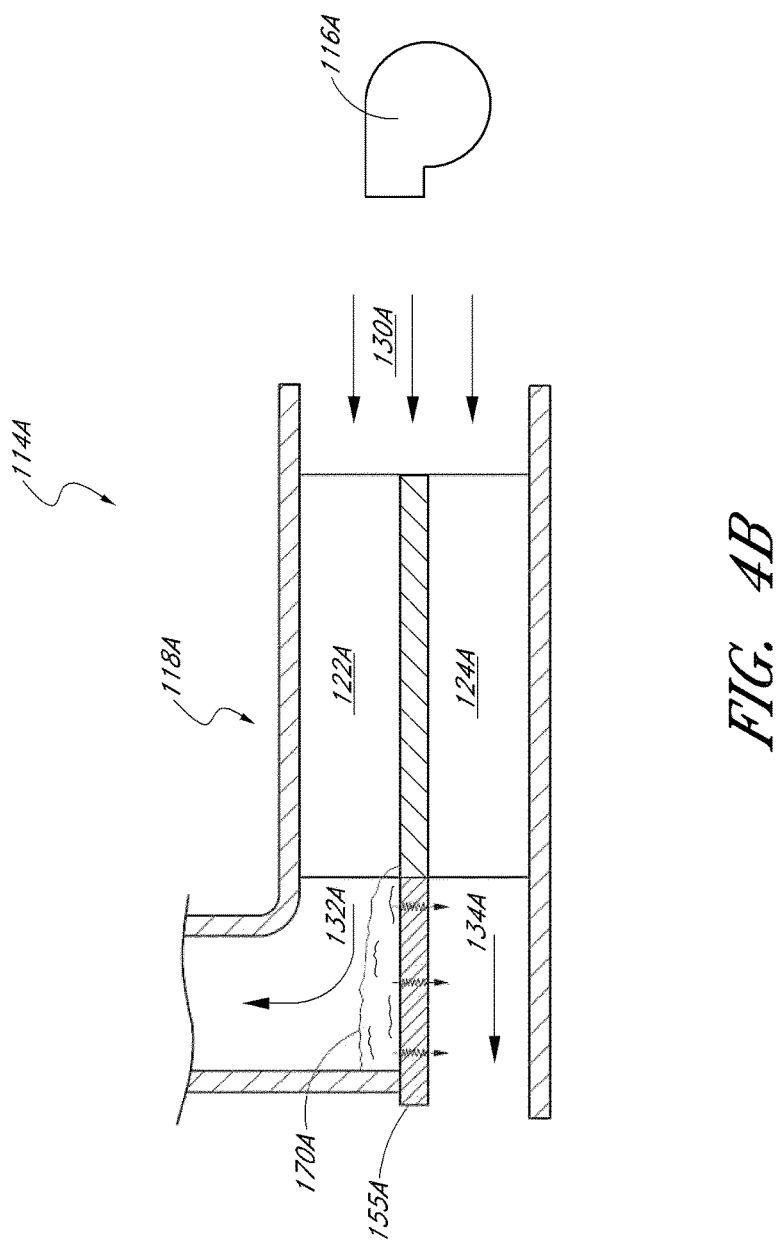
FIG. 4B illustrates a partial cross-sectional view of the fluid module of FIG. 4A when condensation is present.

According to some embodiments, as illustrated in FIG. 4A, a wicking separator gasket 155A is provided generally between the cold side outlet 132A and the hot side outlet 134A. The wicking separator gasket 155A can be configured so that it wicks water and/or other fluids that condense or otherwise form within a fluid module 114A away from the cold side 122A and to the hot side 124A. FIG. 4B demonstrates one embodiment of condensed water 170A and/or other fluids generally passing from the cold side to the hot side through the wicking separator gasket 155A. In some embodiments, water or other liquid entering the hot side can be advantageously evaporated or otherwise removed from the fluid module 114A.

Figure 5:
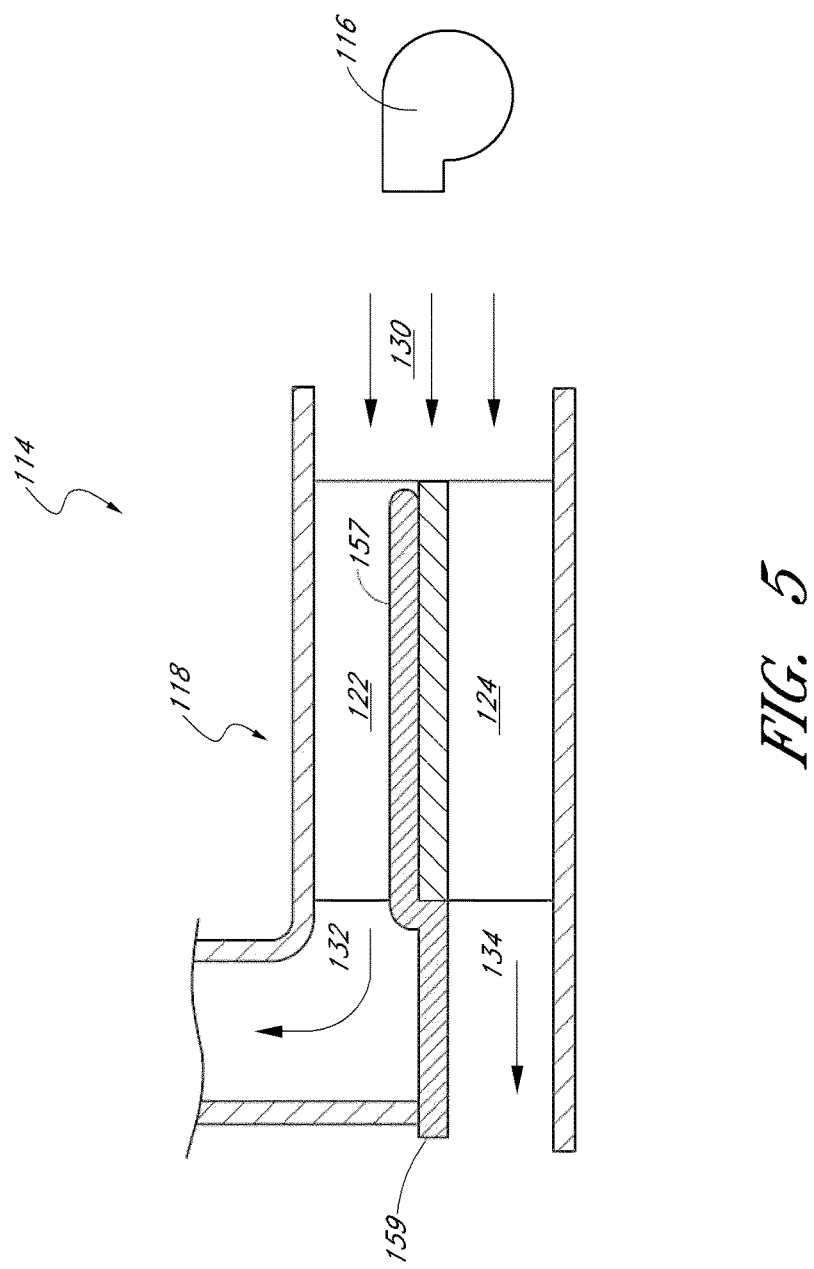
FIG. 5 illustrates a partial cross-sectional view of a fluid module comprising a finger wick and a wicking separator gasket according to one embodiment.

In other embodiments, as shown in FIG. 5, a wicking separator gasket 159 comprises, is coupled to, forms a part of or is otherwise in fluid communication with at least one finger or extension wick 157. For example, such finger wicks 157 can be configured to extend next to or between one or more fins on the cold side 122 of the TED 118. The finger wick 157 can be configured to provide quicker, more efficient and more effective absorption of condensation. In other arrangements, finger wicks 157 can be used with the separator gasket, but without the use of a wicking separator gasket. The finger wick may be configured such that it generally wicks or otherwise transfers water or other condensation away from the cold side to the hot side where it can be advantageously evaporated or otherwise removed from the fluid module 114. Accordingly, the use of finger wicks can increase the efficiency of the wicking process, and thus, the overall efficiency and effectiveness of a fluid conditioning system.

According to certain embodiments, the wicking material comprises one or more of the following characteristics that assist in transferring water and other condensation from the cold side to the hot side of the thermal module. The wicking material can have a low thermal conductivity so as to provide at least a partial thermal barrier between the cold side and the hot side when no condensation is present. Further, the wicking material may provide high capillary action. This capillary action may be in only one direction so as to ensure that the water and other condensation are properly transferred to the hot side of the module. In addition, the wicking material can comprise anti-fungal, anti-bacterial and/or other characteristics that help prevent the growth of potentially harmful or undesirable microorganisms thereon or therein.

In some embodiments, the wicking materials are configured to withstand relatively large variations in temperature (e.g., both short term and long term changes), relative humidity and/or the like. For example, the material can be adapted to withstand a temperature range of approximately 40 to 85 degrees Celsius. The wicking material can generally have a high resistance to air flow, while allowing moisture to wick therethrough. As a result, passage of cooled fluid from the cold side to the hot side of the thermal module can be reduced or minimized. Moreover, the wicking material can be configured so that it has little or no dimensional distortion during use. In addition, according to certain arrangements, the wicking material is configured to withstand the forces, moments, pH variations and/or other elements to which it may be subjected during its useful life. In some embodiments, the wicking separator gasket and/or the finger wick members comprise polypropylene, nylon, other porous or non-porous materials and/or the like.

Condensation Sensors

As discussed herein with reference to wicking materials (FIGS. 2-5), one solution to the above-identified condensate formation problems is to deal with the condensation directly. In other words, allow the condensation to occur and then remove it (e.g., direct it from the cold side to the hot side using a wicking material). This can allow the climate conditioning system to perform at or near a desired level of cooling or heating.

In other embodiments, it may be desirable or necessary to detect the presence of such condensates within or near a TED or other portion of a thermal module. Thus, as discussed in greater detail herein, a robust yet cost effective sensor to detect the presence of condensation can be provided. Accordingly, once the presence of water and/or other fluids is detected by such sensors, the system can be configured to take one or more steps to eliminate the condensation or to otherwise remedy the problem. For example, according to one embodiment, once a sensor detects a threshold level of condensate within or near a TED, the system is designed to reduce the voltage supplied to the TED until the condensation has been completely or partially removed or reduced. Such a reduction in voltage can reduce the extent to which fluids passing through the thermal module are cooled or heated, thereby reducing or stopping the formation of condensate. Such sensors can be utilized on or within any variety of climate conditioning systems and may be placed in any area where condensation is likely to pool or otherwise form.

In one embodiment, a sensor detects the presence of water and/or other fluids by a change in electrical resistance. In other embodiments, sensors detect the presence of condensation by a change in electrical capacitance. Additional details regarding condensate sensors configured to be used in climate controlled seat assemblies are provided herein.

Figure 6A:
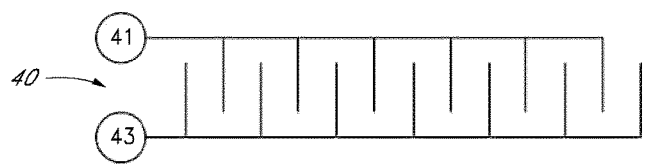
FIG. 6A illustrates a top schematic view of one embodiment of a resistance based condensation sensor.
Figure 6B:
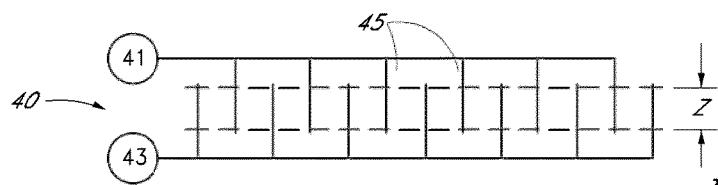
FIG. 6B illustrates a top schematic view of a sensing zone of the condensation sensor of FIG. 6A.

FIGS. 6A-6E illustrate various embodiments of sensors configured to detect the presence of water and other fluids by measuring a change in electrical resistance. As shown in FIGS. 6A and 6B, a sensor 40 can comprise a pair of electrical traces 41, 43 or other conductive members. According to some embodiments, the sensor 40 is designed to continuously monitor the resistance between the adjacent traces 41, 43. Any of the condensate sensors disclosed herein can be configured to continuously or intermittently monitor the resistance, capacitance or any other property across adjacent traces, as desired or required. Theoretically, the traces form an open circuit; however, in reality, there may be a measurable resistance across the traces 41, 43, such as, for example, about 10 mega-Ohms. The presence of a fluid on the sensor 40 can change the measured resistance across the traces 41, 43. Since many fluids, such as, for example, water, are at least partially electrically conductive, the presence of a fluid that electrically connects traces 41, 43 can change the resistance to a measurable degree. Therefore, the circuit formed by the adjacent traces 41, 43 can be "closed."

According to some embodiments, a climate control system is configured so that a change in resistance measured at the sensor 40 triggers a drop in voltage to the TED 18 in order to decrease the cooling effect by the TED. With the conditioned fluid not as cool as before the drop in voltage, condensation formation may decrease or stop. Either way, the voltage can be adapted to remain at a lower level until the electrical resistance increases above a preset or threshold level or until another operational criterion is satisfied (e.g., the passage of a particular time period, a particular upper or lower ambient temperature is met, etc.).

The layout, size, spacing, general orientation and/or other details regarding the traces may vary, as required or desired. For example, such design details can be varied based, at least in part, on the sensor's location within a TED, thermal module or other portion of a climate conditioning system, the space and geometry available at the targeted location, the methods used to manufacture the sensor or to create the traces at the location, the target resistance across the traces (e.g., without the presence of fluids, with the presence of fluids, etc.) and/or the like.

FIG. 6A illustrates one embodiment of a trace design. FIG. 6B shows the potential zone of sensing Z for the design in FIG. 6A or the area most likely for the presence of fluid to bridge the traces 41, 43. Additionally, water and other fluids may not bridge traces 41, 43 if located at dead zones 45 (e.g., generally areas outside of the zone of sensing Z). As shown in FIGS. 6A and 6B, the traces 41, 43 can include main longitudinal portions and shorter arms or other members extending toward one another therefrom, in an alternating and repeating fashion. However, the traces 41, 43 can include a simpler or more intricate design, as desired or required. For example, as discussed herein with reference to FIG. 6E, a sensor can comprise generally straight traces 41, 43 that parallel one another.

Figure 6C:
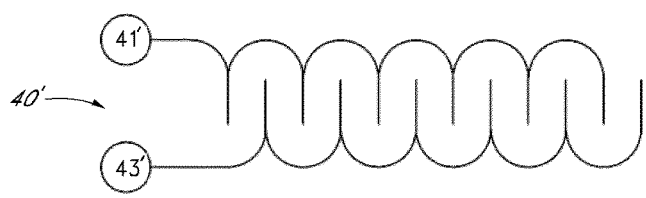
FIG. 6C illustrates a top schematic view of another embodiment of a resistance based condensation sensor.

FIG. 6C illustrates a modified embodiment of a pair of electrical traces configured for use in a condensation sensor. As shown, the potential zone of sensing can be increased, because the distance between traces 41', 43' is maintained at a generally equal spacing for substantially the entire length of the sensor. In any of the trace embodiments disclosed herein, or equivalents thereof, adjacent traces can be spaced substantially close to each other to quickly detect condensation. The spacing between the traces may also be far enough apart so that minor contaminations and other substances or occurrences do not lead to a false detection of condensation.

Figure 6D:
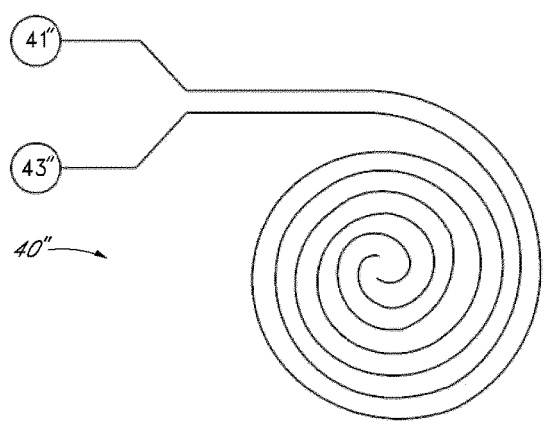
FIG. 6D illustrates a top schematic view of still another embodiment of a resistance based condensation sensor.

FIG. 6D illustrates another embodiment of traces 41", 43" configured to be used within a condensate sensor. The depicted traces 41", 43" can be configured to reduce the dead zones within a sensor. For example, the spacing between adjacent traces 41", 43" can be maintained constant or substantially constant. Thus, because of the circular nature of the trace orientation, the presence of dead zones therein can be advantageously reduced or eliminated. As discussed in greater detail herein, there may be other characteristics, besides the reduction of dead zones, that may also be considered in the design of the sensor, such as, for example, cost and ease of manufacture, durability, ability to resist corrosion, a target resistance across adjacent traces and/or the like. Accordingly, any of the trace embodiments disclosed herein, including those illustrated in FIGS. 6A-6E, can be modified, as desired or required to achieve a desired set of design criteria.

Figure 6E:
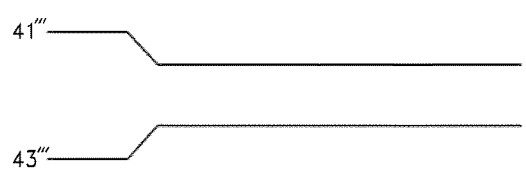
FIG. 6E illustrates a top schematic view of yet another embodiment of a resistance based condensation sensor.

FIG. 6E illustrates yet another embodiment of electrical traces 41''', 43''' configured to be used in a condensation sensor. As shown, the traces 41''', 43''' can comprise substantially straight portions that are generally parallel to each other. Any other trace configuration can be used in a condensate sensor.

Figure 7:
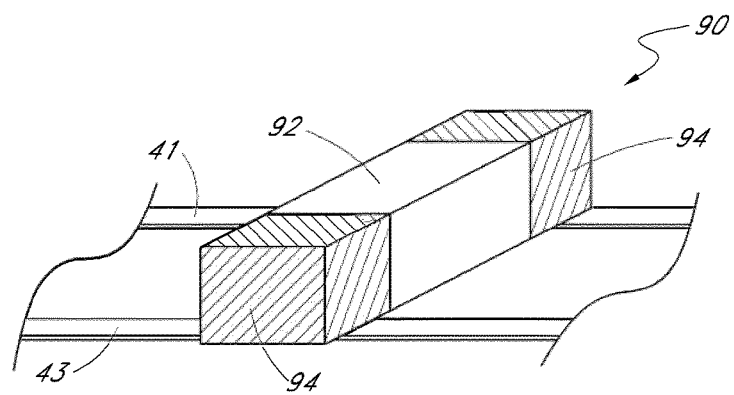
FIG. 7 illustrates a perspective view of another embodiment of a resistance-based condensation sensor.

Another embodiment of a resistance-based sensor 90 configured to detect the presence of water or other liquids on or near a TED or other portion of a thermal module is illustrated in FIG. 7. As shown, the sensor 90 can include a high resistance exposed chip sensor or other surface mounted device (SMD). For example, such a SMD can be similar to a bare resistor, capacitor or other chip device that is configured to be secured to a circuit board. The sensor 90 can include a main body portion 92 having a relatively high electrical resistivity. According to certain arrangements, the main body portion 92 comprises solid or porous alumina ceramic or the like. The sensor 90 can include ends 94 comprising tin or another material configured to be soldered to an adjacent conductive strip or trace. Thus, as shown, the sensor 90 can be sized, shaped and otherwise configured to extend across adjacent conductive traces 41, 43 positioned on or near a TED or other targeted portion of a thermal module.

With continued reference to FIG. 7, the sensor 90 can be soldered or otherwise placed in electrical communication with electrical traces 41, 43 or other conductive members across which a resistance can be measured. Thus, such a sensor 90 can advantageously permit the traces 41, 43 or other conductive members to which the sensor attaches to be selectively coated or otherwise shielded with one or more protective coatings, layers or other members. This can help extend the life of the traces 41, 43. In addition, such embodiments can simplify the manner in which one or more sensors 90 are provided within a TED or other portion of a thermal module.

According to some arrangements, when water or other condensation forms on or near the sensor 90, such fluids can enter within or onto the main body portion 92 via wicking, absorption, through one or more openings and/or the like. Consequently, the presence of water or other fluids within and/or on the main body portion 92 of the sensor 90 can lower the electrical resistance across the two ends 94. Thus, as discussed herein with reference to other sensor embodiments, such a change in resistance can confirm the presence of condensation within the thermal module. As a result, one or more corresponding actions can be taken to adjust the operation of the climate control system (e.g., reduce or cut-off electrical current to the TED).

In any of the embodiments of sensors or other electrical devices disclosed herein, including but not limited to the sensors discussed with reference to FIGS. 6A-6E and 7, the electrical traces or other conductive members can be coated with one or more materials. For example, tin, silver, gold and/or any other conductive or semi-conductive materials can be plated, soldered or otherwise disposed onto the traces, either partially or completely. Such coatings and other materials can help protect the underlying traces, which in some embodiments comprise copper and/or other materials generally susceptible to corrosion, oxidation and other environmentally-induced damage. As a result, such protective materials can help extend the life of the sensors and/or other components of a thermal module.

In certain embodiments, under normal circumstances, the resistance change across adjacent traces measured by the sensor may change gradually over time. For example, with the accumulation of oxides, other deposits and/or other materials on or near the traces, the resistance between the traces can change, usually decrease, even without the presence of condensate. In contrast, when condensate is present, the resistance across the traces decreases at a relatively faster rate (e.g., within seconds or minutes), depending, at least in part, on the rate of condensation formation and accumulation.

Therefore, the thermal module and/or other portions of a climate control assembly can be configured to respond to either an absolute decrease in electrical resistance or a decrease in resistance that occurs over a shorter time period. In the first situation, a decrease in electrical resistance below a specified threshold level could trigger a corresponding drop in voltage supplied to the TED so as to decrease or eliminate the formation of additional condensate within the fluid module. However, this can be undesirable, as the decrease in resistance may be caused by normal degradation (e.g., oxidation, accumulation of other deposits and substances) rather than the actual presence of condensation.

On the other hand, under the "rapid change" operating scenario, a control system for the TED and other components of a thermal module can be configured to modify the voltage supplied thereto only if the decrease in electrical resistance measured across the traces occurs within a specific time period. Thus, such embodiments could be beneficial in more accurately detecting the presence of water or other liquids on or near a TED. Accordingly, this can avoid a false positive, where the sensor incorrectly triggers a reduction in voltage to the TED. By having the sensor measure a rapid change in electrical resistance over a shorter period of time, some of the long term problems associated with corrosion of the sensor, the accumulation of deposits on or near the sensor's traces and/or the like may be avoided.

Figure 8:
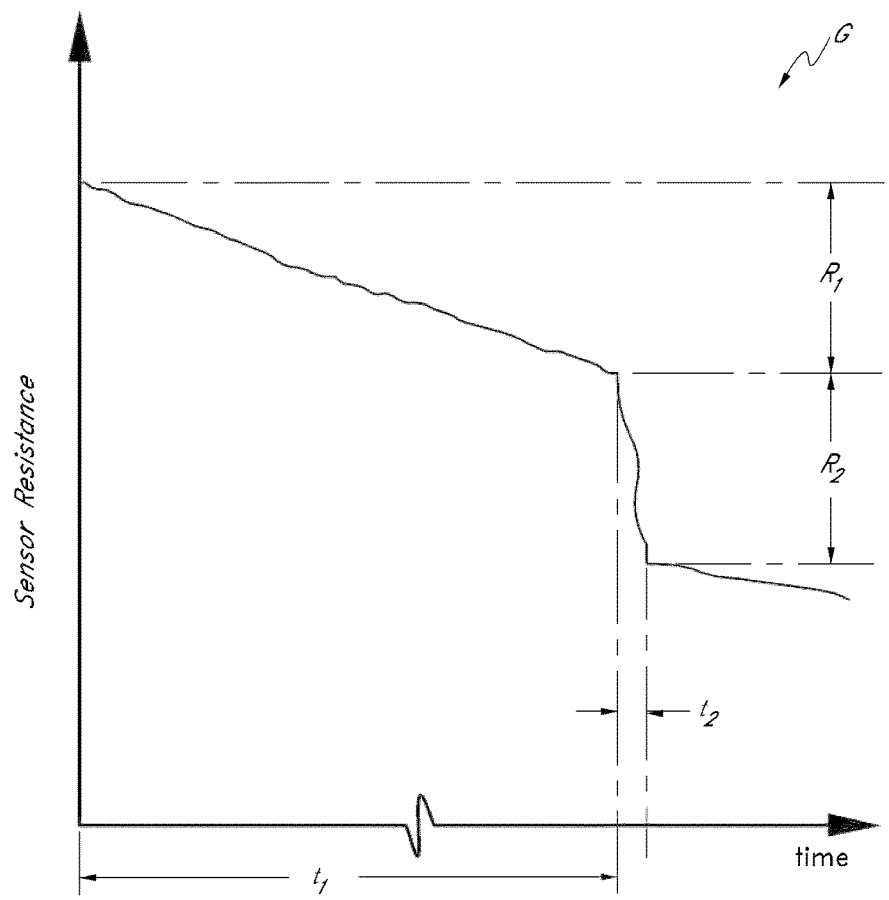
FIG. 8 illustrates a chart showing change in resistance measured at a resistance-based condensate sensor over time, according to one embodiment.

One embodiment of a graph G illustrating decreases in electrical resistance across a condensation sensor over time is provided in FIG. 8. As shown, the electrical resistance across a sensor's traces can gradually decrease over time due to corrosion, the accumulation of dirt, deposits or other substances on or near the sensor's traces and/or any other factor or reason. As discussed herein, this is typical for many embodiments of condensation sensors used in TEDs, thermal modules and similar environments. By way of example, during a first time period $t_1$, the resistance can decrease by a first resistance value $R_1$ (e.g., a drop in overall resistance, a drop in percentage of resistance, etc.). Such a first time period $t_1$ may comprise days, months or years, depending on the particular environmental and operating conditions to which the sensor is subjected.

With further reference to FIG. 8, electrical resistance can drop by a second resistance value $R_2$ due primarily to the accumulation of water or other condensation across the a sensor. The time period during which such a resistance drop $R_2$ occurs can be substantially short (e.g., seconds, minutes, etc.), especially when compared to $R_1$. Thus, assuming the drops in total resistance (or percentage of resistance) represented by $R_1$ and $R_2$ are generally equal, a sensor that does not take time into account would not be able to distinguish between the gradual drop in resistance over time period $t_1$ and the rapid drop over $t_2$. Consequently, the sensor may not be able to adequately detect the presence of condensation.

In order to remedy such a discrepancy, in some embodiments, a climate control system is configured to compare a particular drop in resistance measured across a sensor in the context of the time period that such a drop occurred. Thus, a system may be configured to modify the voltage supplied to a TED only when the condensate sensor detects a specific drop in resistance value or percentage over a minimum time period. For example, according to certain configurations, a system will adjust the temperature of a TED if the resistance drops by at least 5%, 10%, 15%, 20%, more than 20% or some other value over a 1-minute, 2-minute, 5-minute, 10-minute, 15-minute, 30-minute or other time period. In other arrangements, the minimum percentage of resistance drop and/or the time period over which such a resistance drop must occur can be varied, as desired or required.

In some embodiments, electrical traces can be etched onto a surface. As discussed in greater detail herein, such a surface can be on or form a part of a TED 18, a fluid distribution system 12 or other device or component of a climate-controlled system for a seating assembly (FIGS. 1 and 2) or any other device.

Figure 9A:
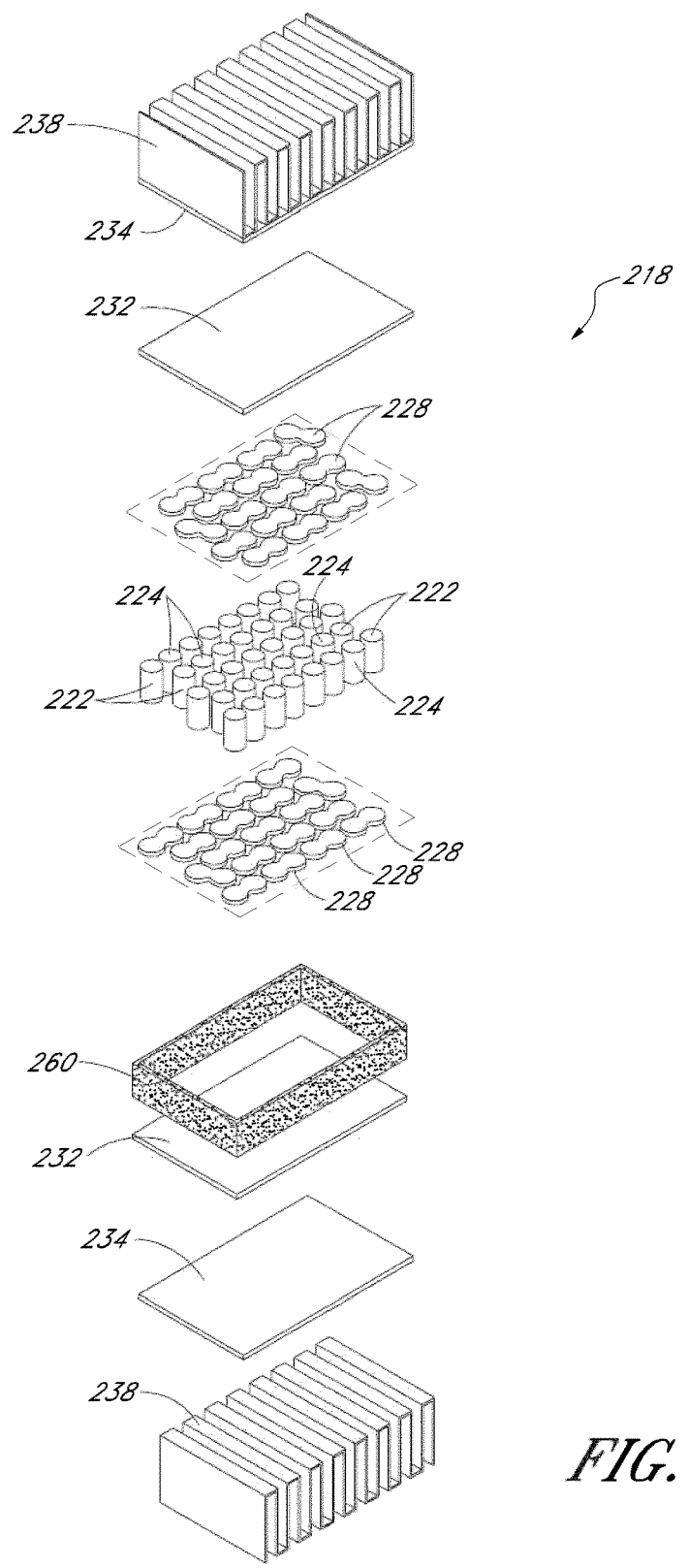
FIG. 9A illustrates an exploded perspective view of a thermoelectric device according to one embodiment.
Figure 9B:
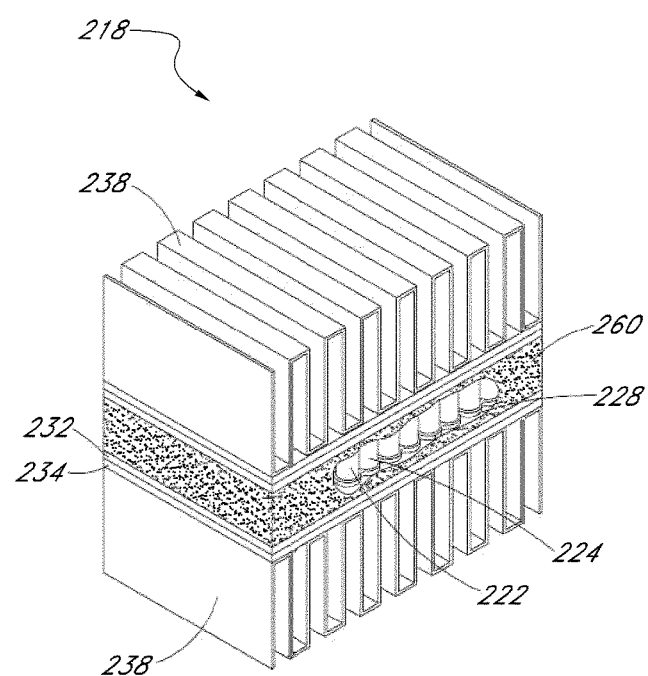
FIG. 9B illustrates a perspective view of an assembled version of the thermoelectric device of FIG. 9A.

The sensor will now be discussed in relation to the TED 218 illustrated in FIGS. 9A and 9B. As shown, the TED 218 can include a plurality of dissimilar conductive elements or pellets 222, 224. In some arrangements, pairs of dissimilar conductive elements 222, 224 are coupled together by a series of electrical joining elements or tabs 228, which are, in turn, disposed between a pair of opposing substrates 232. The substrates 232 can comprise polyimide, ceramic, epoxy or another material that has desirable electrical insulation and thermal conductive properties. In the depicted embodiment, each substrate 232 is thermally coupled to a heat transfer member 238 (e.g., fins) through one or more copper pads 234 or other support members. In some embodiments, a seal 260 is optionally provided between the opposing substrates 232 to help protect the elements 222, 224 that are situated therebetween.

One or more condensation sensors, in accordance with the various embodiments disclosed herein, can be used with the TED 218 to detect the presence of water or other fluids. In some embodiments, the sensor is located on, along or near the substrate, generally on the side opposite the pellets at the downstream side of the TED. Since in some arrangements, the cold-downstream side of the TED is the coldest location or one of the coldest locations in the thermal module, condensation is likely to form at or near this location. However, in other embodiments, one or more condensation sensors are positioned on, along or near a different portion of the TED 218 (e.g., fins, copper pads, etc.), the thermal module and/or other portions of the climate control seat assembly, as desired or required. Thus, the embodiments disclosed herein, including the advantages, features and other details provided therewith, can be applied to any condensation sensor included within the climate control seat assembly, regardless of its location, type and/or other characteristics.

Figure 10A:
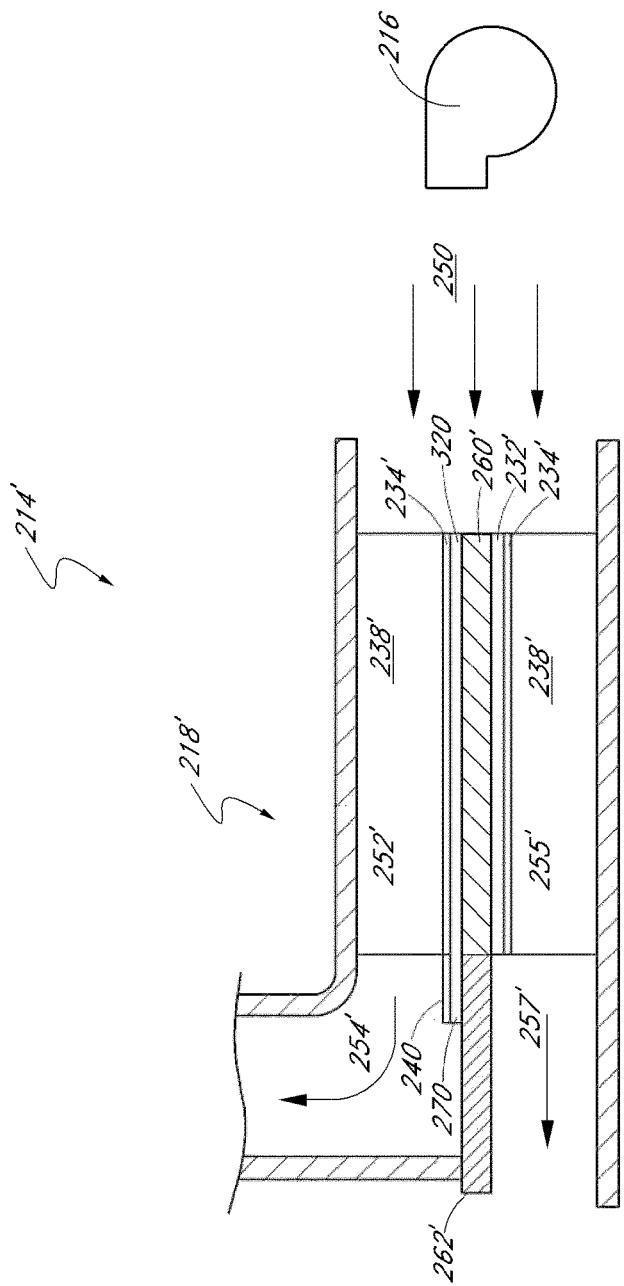
FIG. 10A illustrates a partial cross-sectional view of a fluid module comprising a condensation sensor according to one embodiment.
Figure 10B:
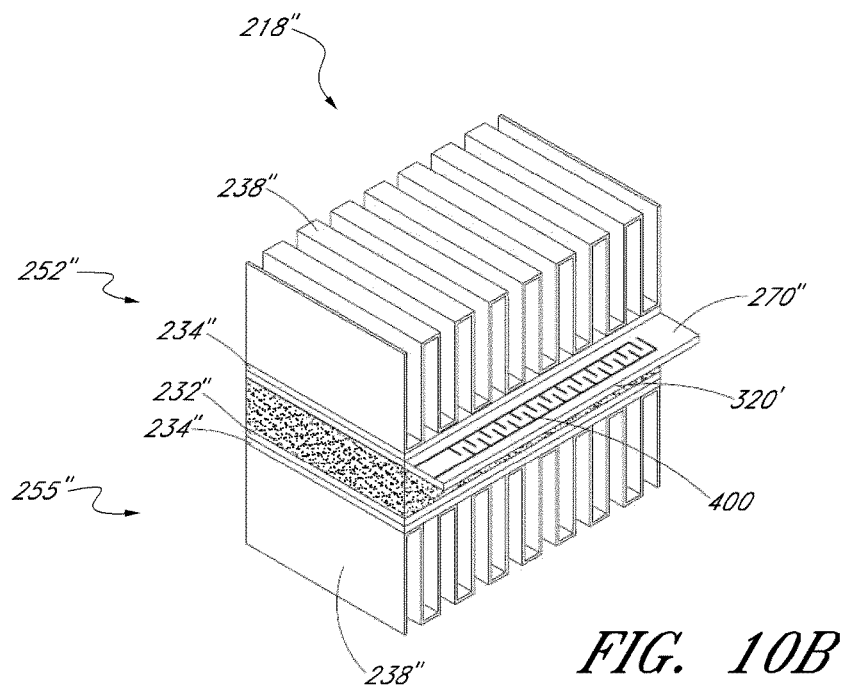
FIG. 10B illustrates a perspective view of an assembled version of a thermoelectric device comprising a resistance based condensation sensor according to one embodiment.

FIG. 10A illustrates a different embodiment of a fluid module 214'. As shown, the TED 218' can include a substrate 320 which is generally longer than an adjacent thermal conductive element 234' and which may form a ledge or shelf. In some embodiments, a sensor 240 is formed on the ledge 270 of substrate 320. A portion of the air or other fluid that enters through the inlet 250' of the fluid module 214' is diverted to the main side 252' and passes by the heat transfer member 238' (e.g., fins). In some arrangements, fluid passing by the heat transfer member 238' of the main side is selectively cooled. Consequently, condensation may form on the heat transfer member 238' and/or elsewhere on the TED 218' or the fluid module 214'. Some condensation can contact the sensor 240, which may be configured in accordance with one of the embodiments disclosed herein or a variation thereof. Thus, the sensor 240 can be configured to detect the condensation and, either directly or indirectly, trigger a decrease in voltage supplied to the TED 18'. For example, in some embodiments, the sensor 240 is operatively connected to a controller that is adapted to receive data from the sensor and adjust the voltage supplied to the TED accordingly. FIG. 10B shows another embodiment of a TED 218" that comprises a sensor 400 along a ledge 270" or other extension of the substrate 320'. The quantity, type, size, shape, location and/or other details regarding the condensation sensors used in a TED and/or other portions of a thermal module or climate control system can vary, as desired or required.

Figure 10C:
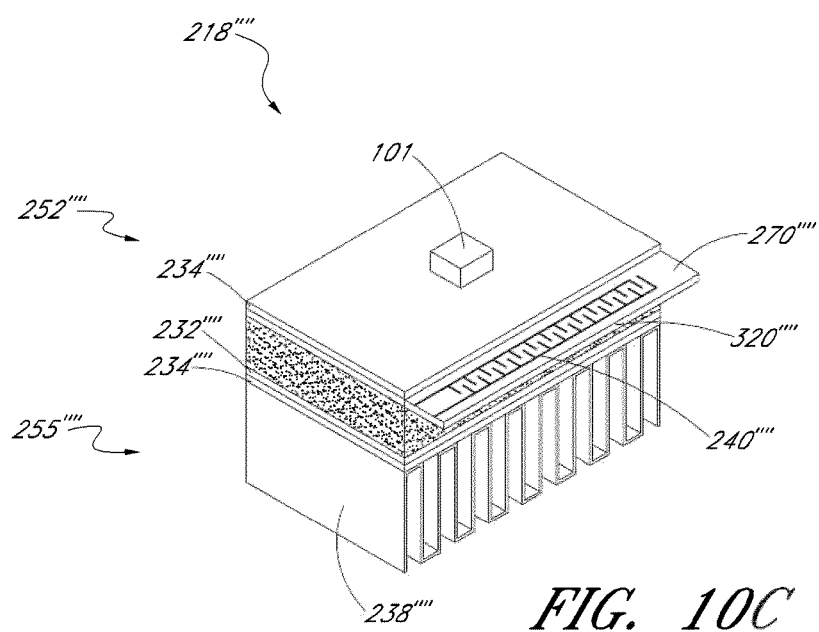
FIG. 10C illustrates a perspective view of an assembled version of a thermoelectric device comprising a resistance based condensation sensor according to another embodiment.

In certain embodiments, as illustrated in FIG. 10C, the TED 218"" includes fins 238" (or other heat transfer members) along its waste side 255"" but not along its main side 252"". Such an arrangement can be used to heat or cool a particular item placed in thermal communication with the main side 252"" of the TED 218"". In some embodiments, such configurations are used to selectively heat and/or cool beverage containers or the like. By way of example, an item 101 to be chilled (e.g., a beverage container, a food item, etc.) may be placed directly on the main side 252"" of the TED. When the TED 18"" is activated (e.g., electrically energized), the main side 252"" can be configured to cool. Consequently, the item 101 can be conductively and/or convectively cooled. In some arrangements, one or more condensate sensors 240"" are positioned on a ledge 270"" of the substrate, another portion of the substrate 320"" and/or any other location of the TED 218"". For example, a condensate sensor is provided on or along the same surface as the item 101 to be chilled.

According to some embodiments, a sensor is configured to detect the presence of water and/or other condensation by measuring electrical capacitance. Such sensors may function in a similar manner as the resistance-based sensors in that a change in capacitance can be correlated to the presence of condensation on or near a sensor. Accordingly, the climate control system can be configured to decrease the voltage supplied to the TED in order to partially or completely eliminate such condensate from the system.

As discussed, in any of the embodiments disclosed herein, a climate control system can be configured to restore the electrical current supplied to one or more TEDs to its original or other value once the sensor no longer detects the presence of condensate.

In some arrangements, a capacitance based sensor can provide certain advantages over resistance based sensors. For example, as discussed in greater detail herein, resistance based sensors can be susceptible to damage (e.g., by corrosion, contamination, etc.). Likewise, however, there may be certain situations where a resistance based sensor may be favored over a capacitance based sensor. In discussing any shortcomings with regards to various alternatives herein, such as, for example, condensation sensors, applicant in no way disavows the use of any of the devices, systems, methods, design features and/or other characteristics or aspects of such embodiments or equivalents thereof, as each situation may require a balancing of features and criteria, which balancing may be different for other situations.

Figure 11A:
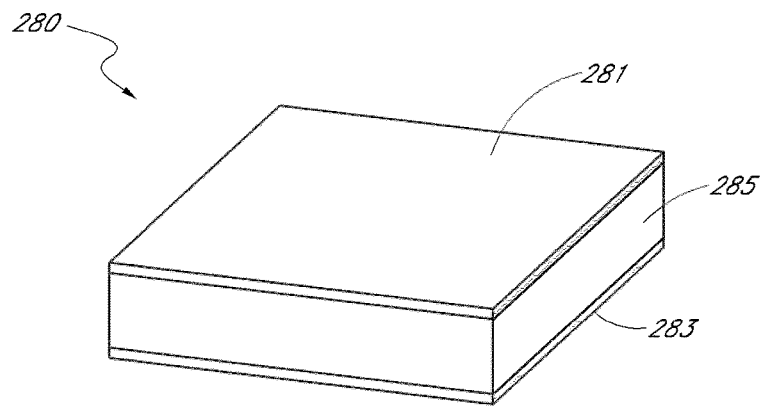
FIG. 11A illustrates a schematic perspective view demonstrating the general principles of a capacitance based condensation sensor according to one embodiment.

FIG. 11A illustrates one embodiment of a capacitance based sensor 280. As shown, the sensor 280 can comprise a first plate 281, a second plate 283 and a material 285 or central portion generally located between the first plate 281 and the second plate 283. The first plate 281 and the second plate 283 can include one or more conductive materials. The material 285 or central portion of the sensor 280 can comprise one or more materials that are configured to absorb fluids (e.g., water, other liquids, condensation and/or the like). According to some embodiments, as the moisture level within the material 285 changes, the capacitance measured across the first plate 281 and the second plate 283 also changes. A change in capacitance above a certain set point or threshold, as measured by a sensor 280, can be configured to cause a reduction in the voltage supplied to a TED. In some arrangements, such a TED can be adapted to operate at the reduced voltage until the capacitance measured across the first plate 281 and the second plate 283 returns to a predetermined or satisfactory level. For example, the voltage to the TED may be raised once the capacitance increases above the same threshold that caused a reduction in voltage. Thus, when the capacitance increases above a given setpoint, a controller operatively connected to the sensor and the TED directs the voltage supplied to the TED to be returned to the original level. In other embodiments, the climate control system is configured to have two or more different capacitance levels or thresholds above or below which the voltage supplied to the TED is modified (e.g., increased, decreased, etc.).

According to certain configurations, a change in capacitance measured at the sensor 280 results in a drop in voltage to the TED, in order to decrease the cooling effect on the fluid being thermally conditioned. Thus, since the conditioned fluid is not as cold as it was before the voltage reduction, condensation formation can advantageously stop or decrease. As discussed, in such circumstances, the voltage can remain at a lower level until the capacitance increases above a desired threshold. Once the desired threshold capacitance is achieved, the supply of electrical current to the TED can be restored, either to a previous level or another level, in accordance with a desired control scheme.

In some arrangements, capacitance based sensors are advantageously used in TEDs that comprise flexible substrates. However, resistance based or other types of condensation sensors can also be used for such TEDs. In some embodiments where the TEDs include ceramic substrates, resistance based condensation sensors can be used.

According to some embodiments, the material 285 or central portion, which is positioned generally between the conductive plates 281, 283 of a capacitance based sensor 280, can also serve as a substrate layer for a TED. For example, flexible substrates, such as polyimide, can be adapted to absorb fluids. Thus, as such substrates absorb water or other fluids formed on or within a TED, the sensor 280 can detect a corresponding change in capacitance measured across its plates 281, 283. As polyimide is generally highly hydroscopic, it is well-suited for such an application. In other embodiments, one or more other materials can be used to serve the dual role of a TED substrate and a material layer for a capacitance based condensate sensor. Further, even materials that have average or poor hydroscopic characteristics, such as, for example, ceramics, can be modified (e.g., combined with other materials, provided with a porous structure, etc.) in order to use them in such applications.

Figure 11B:
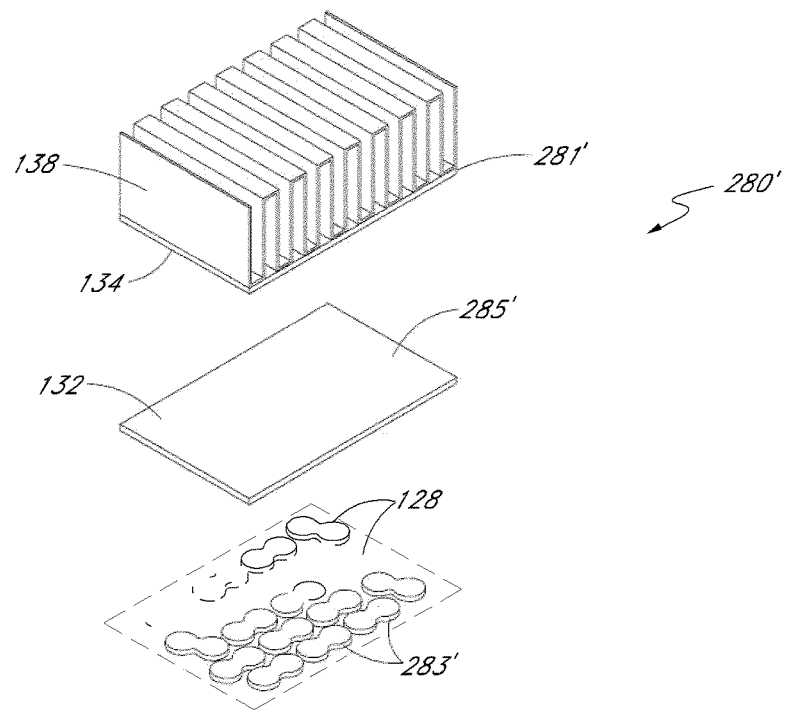
FIG. 11B illustrates an exploded perspective view of a condensation sensor that uses capacitance to detect the presence of a fluid according to one embodiment.

With reference to FIG. 11B, a capacitance based sensor can comprise, among other things, a thermal conductive element 134, electrical joining elements or tabs 128 and a substrate 132. In some embodiments, the thermal conductive element 134 and the electrical joining elements 128 can be configured to serve as the first 281' and second 283' conductive plates of a sensor, respectively. The substrate 132 can effectively be the material or central portion of the capacitance based sensor that is generally positioned between upper and lower conductive plates. As discussed, the substrate 132 can comprise one or more materials that absorb water and other fluids. Accordingly, as the substrate absorbs condensation, the capacitance measured across the first 281' and second 283' conductive plates may change. Such a change in capacitance can signal that an undesirable amount of condensate exists at or near the TED. Thus, the climate control system can be advantageously configured to reduce the amount of voltage being supplied to the TED. In some embodiments, the first 281' and second 283' conductive plates comprise copper and/or another highly conductive material.

In certain embodiments, the substrate layer used in TEDs can be relatively thin. For example, the thickness of a polyimide substrate may be less than 0.001 inch (0.025 mm). Therefore, the surface area exposed for moisture absorption may also be relatively small. For example, the exposed surface area may include only the length of an exposed edge. In some embodiments, the exposed surface area is increased by various methods. For example, the first conductive plate 281' can include an orifice to allow for more enhanced moisture absorption. In other embodiments, the first conductive plate 281' comprises a plurality of orifices. The orifices can be positioned in or along one localized area. Alternatively, such orifices can be spread out generally along the first conductive plate 281'. In other arrangements, the orifices are concentrated at locations where the likelihood of condensation formation is relatively high, such as, for example, on the main side, generally downstream of the airflow of the TED. In other configurations, the orifices are located on a ledge or other protruding member or portion that extends beyond the main side heat transfer member 138 of the TED.

Figure 12:
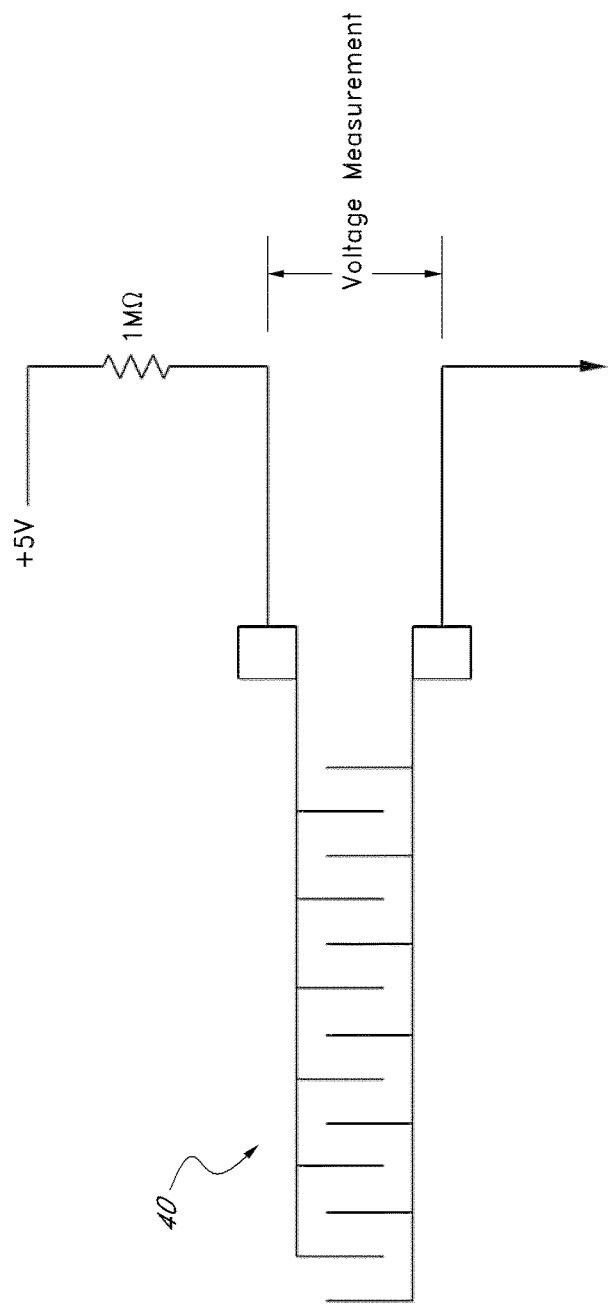
FIG. 12 illustrates an embodiment of an electrical circuit comprising a condensation sensor.

FIG. 12 schematically illustrates a condensation sensor 40, in accordance with any of the embodiments disclosed herein (e.g., resistance based sensors, capacitance based sensors, etc.), which has been incorporated into an electrical circuit. In some embodiments, an off-the-shelf or otherwise commercially available sensor can be used within or near a thermal module and/or other location of a climate control system, either in lieu of or in addition to any of the specific sensor embodiments disclosed herein. As shown, a voltage can be measured across the sensor 40 with a voltage (e.g., 5V) and a resistance (e.g., 1 mega-Ohm) applied upstream of the sensor 40.

While the condensate sensors disclosed herein are generally described in the context of TEDs and climate control systems for seating assemblies, it will be appreciated that such embodiments, and variations thereof, are applicable to other applications as well. For example, such sensors can be used in conjunction with any heating and/or cooling system in which condensation is likely to form or in which water or other liquids are likely to accumulate. Further, such sensors can be used to detect condensation on printed circuit boards for electric devices, other electronic components and/or any other electrical or mechanical device where removal of fluids from portions thereof is important. In other embodiments, such sensors can be stand alone electronic sensors that generate a signal (e.g., 5V) when condensation forms.

Control Schemes Using Relative Humidit and/or Temperature Detection

A climate control seating assembly, such as, for example, a vehicle seat, a bed, a wheelchair, another medical bed or chair and/or the like, can be advantageously configured to automatically operate within a desired comfort zone. One embodiment of such a comfort zone (generally represented by cross-hatched area 510) is schematically illustrated in the graph 500 of FIG. 13. As shown, a desired comfort zone 510 can be based, at least in part, on the temperature and relative humidity of a particular environment (e.g., ambient air, thermally conditioned air or other fluid being delivered through a climate controlled seat assembly, etc.). Thus, if the relative humidity is too low or too high for a particular temperature, or vice versa, the comfort level to an occupant situated within such an environment can be diminished or generally outside a target area.

Figure 13:
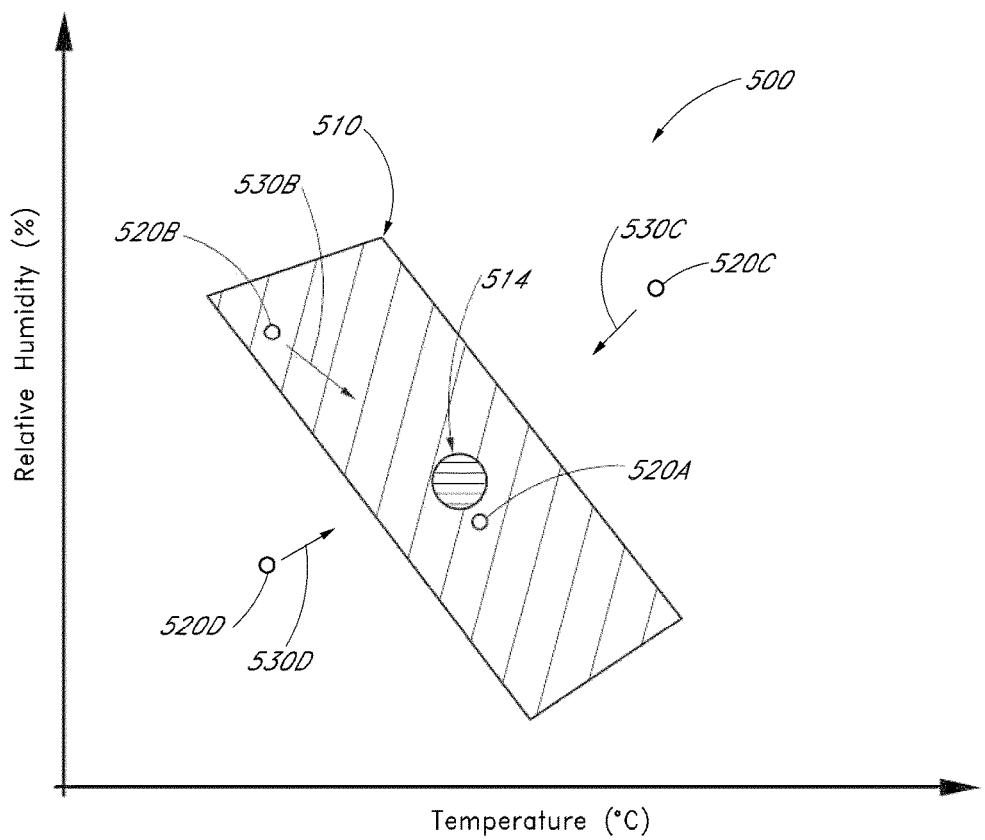
FIG. 13 illustrates one embodiment of a comfort zone in relation to temperature and relative humidity.

For example, with reference to a condition generally represented as point 520C on the graph 500 of FIG. 13, the relative humidity is too high for the specific temperature. Alternatively, it can be said that the temperature of point 520C is too high for the specific relative humidity. Regardless, in some embodiments, in order to improve the comfort level of an occupant who is present in that environment, a climate control system can be configured to change the surrounding conditions in an effort to achieve the target comfort zone 510 (e.g., in a direction generally represented by arrow 520C). Likewise, a climate control system for a seating assembly situated in the environmental condition represented by point 520D can be configured to operate so as to change the surrounding conditions in an effort to achieve the target comfort zone 510 (e.g., in a direction generally represented by arrow 520D). In FIG. 13, environmental conditions generally represented by points 520A and 520B are already within a target comfort zone 510. Thus, in some embodiments, a climate control system can be configured to maintain such surrounding environmental conditions, at least while an occupant is positioned on the corresponding seating assembly (e.g., vehicle seat, bed, wheelchair, another medical bed or chair, etc.).

In some embodiments, a climate control system for a seating assembly is configured to include additional comfort zones or target operating conditions. For example, as illustrated schematically in FIG. 13, a second comfort zone 514 can be included as a smaller area within a main comfort zone 510. The second comfort zone 514 can represent a combination of environmental conditions (e.g., temperature, relative humidity, etc.) that are even more preferable that other portions of the main comfort zone 510. Thus, in FIG. 13, although within the main comfort zone 510, the environmental condition represented by point 520B falls outside the second, more preferable, comfort zone 514. Thus, a climate control system for a seating assembly situated in the environmental condition represented by point 520B can be configured to operate so as to change the surrounding conditions toward the second comfort zone 514 (e.g., in a direction generally represented by arrow 520B).

In other embodiments, a climate control system can include one, two or more target comfort zones, as desired or required. For example, a climate control system can include separate target zones for summer and winter operation. In such arrangements, therefore, the climate control system can be configured to detect the time of year and/or the desired comfort zone under which a climate controlled seat assembly is to be operated.

The incorporation of such automated control schemes within a climate control system can generally offer a more sophisticated method of operating a climate control seat assembly (e.g., bed). Further, as discussed herein, such schemes can also help to simplify the operation of a climate controlled seat assembly and/or to lower costs (e.g., manufacturing costs, operating costs, etc.). This can be particularly important where it is required or highly desirable to maintain a threshold comfort level, such as, for example, for patients situated on wheelchairs, medical beds and/or the like. Further, such control schemes can be especially useful for seating assemblies configured to receive occupants that have limited mobility and/or for seating assemblies where occupants are typically seated for extended time periods (e.g., beds, airplane seats, other vehicle seats, movie theaters, hospital beds, convalescent beds, wheelchairs, other medical beds or chairs, etc.).

According to some embodiments, data or other information obtained by one or more sensors is used to selectively control a climate control system in order to achieve an environmental condition which is located within a desired comfort zone 510, 514 (FIG. 13). For instance, a climate control system can include one or more temperature sensors and/or relative humidity sensors. As discussed in greater detail herein, such sensors can be situated along various portions of a seating assembly (e.g., TED, thermal module, fluid distribution system, inlet or outlet of a fluid transfer device, fluid inlet, surface of an assembly against which an seated occupant is positioned, etc.) and/or any other location within the same ambient environment as the seating assembly (e.g., an interior location of a automobile, a bedroom, a hospital room, etc.). In other embodiments, one or more additional types of sensors are also provided, such as, for example, an occupant detection sensor (e.g. configured to automatically detect when an occupant is seated on a vehicle seat, a bed and/or any other seating assembly).

Regardless of the quantity, type, location and/or other details regarding the various sensors included within a particular assembly, the various components of the climate control system can be configured to operate (in one embodiment, preferably automatically) in accordance with a desired control algorithm. According to some embodiments, the control algorithm includes a level of complexity so that it automatically varies the amount of heating and/or cooling provided at the seating assembly based, at least in part, on the existing environmental conditions (e.g., temperature, relative humidity, etc.) and the target comfort zone.

Figure 14A:
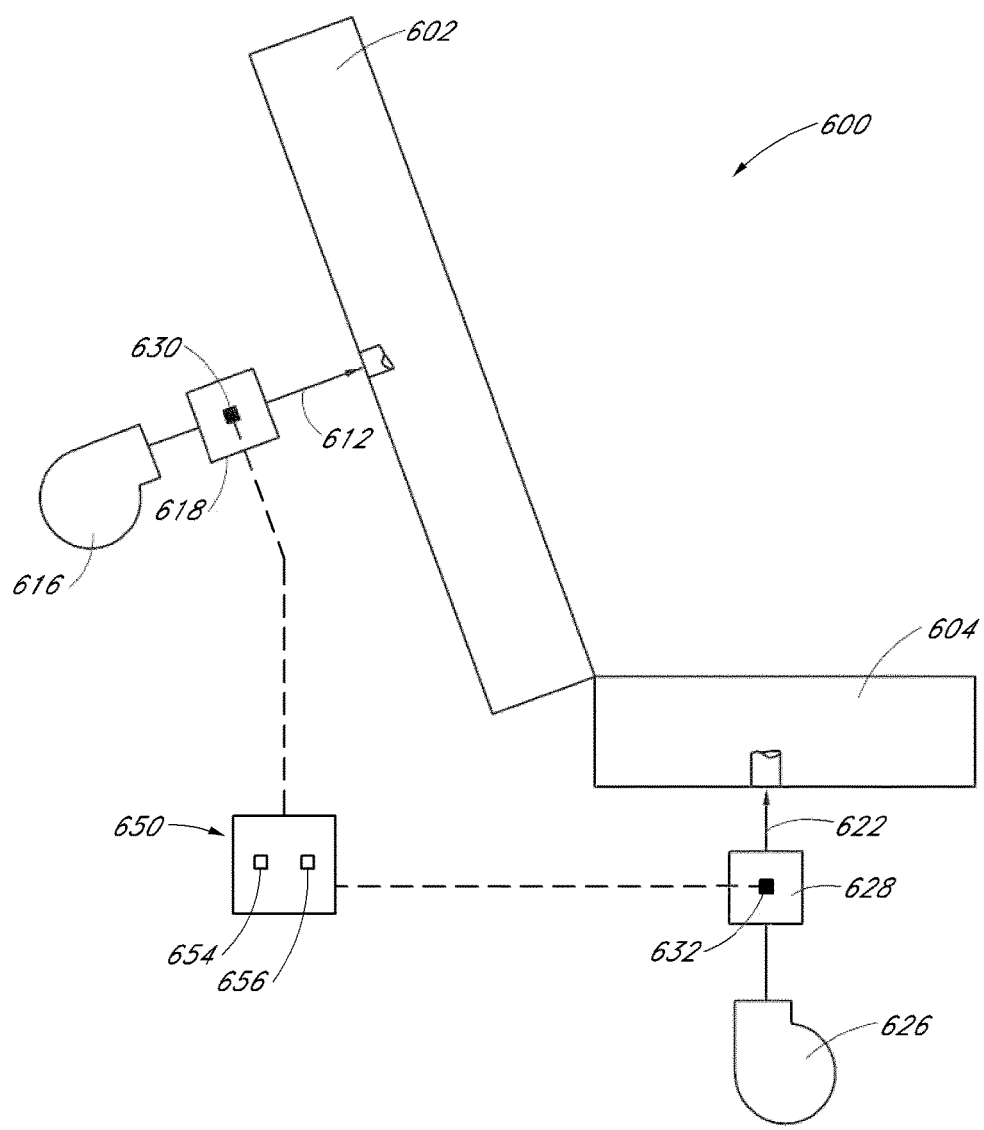
FIG. 14A illustrates one embodiment of a climate controlled seating assembly comprising a plurality of sensors according to one embodiment.

Accordingly, in some embodiments, a control system for a climate control seating assembly is configured to receive as inputs into its control algorithm data and other information regarding the temperature and relative humidity from one or more locations. For example, as illustrated in FIG. 14A, a climate controlled vehicle seat 600 can include fluid distribution systems 612, 622 along its seat back portion 602 and/or seat bottom portion 604. Each fluid distribution system 612, 622 can be in fluid communication with a fluid transfer device 616, 626 (e.g., fan, blower, etc.) and a thermoelectric device 618, 618 (e.g., a Peltier circuit, other device configured to selectively temperature condition air or other fluids passing therethrough, etc.). In the illustrated arrangement, a temperature sensor 630, 632 is located within or near each thermoelectric device 618, 628. Such sensors 630, 632 can be configured to detect the temperature of the TED, the temperature of a fin or other heat transfer member, the temperature of any other portion or components of the TED, the operating temperature of the TED, the temperature of the fluid within, entering or exiting the fins or other portion of the TED, the temperature upstream or downstream of the TED, the temperature upstream or downstream of the fluid transfer device, the temperature within the fluid distribution system 612, 622 and/or the temperature along any other portion of the thermal module or the seat assembly.

With continued reference to FIG. 14A, one or more sensors 654, 656 can be provided on a controller 650 and/or any other location surrounding the seat assembly 600, either in lieu of or in addition to the temperature sensors 630, 632 included on or near the TEDs. For instance, the depicted controller 650 can include a sensor 654 configured to detect the ambient temperature. Further, the controller 650 may also include a sensor 656 configured to detect the relative humidity of the surrounding environment (e.g., the interior or exterior of an automobile). Although not included in the depicted arrangement, one or more additional relative humidity sensors can be provided on or near the TEDs, within the fluid distribution systems of the seat assembly 600, any location where a temperature sensor is located (e.g., upstream or downstream of a fluid transfer device) and/or the like. Such relative humidity sensors can be configured to provide additional operational data that may further enhance the ability of a climate control system to automatically operate within a desired comfort zone 510, 514 (FIG. 13).

As illustrated in FIG. 14A, the controller 650 can be operatively connected to the various sensors 630, 632, 654, 656 located within or in the vicinity of a climate control seat assembly 600. Information received from the various sensors can be used to automatically regulate one or more devices or aspects of the climate control system, such as, for example, TEDs 618, 628 (e.g., the amount of voltage supplied thereto), the fluid transfer devices (e.g., the rate of which air is transferred through the fluid distribution systems 612, 622) and/or the like. In other embodiments, the controller 650 is also operatively connected to one or more external climate control systems (e.g., the automobile's or building's HVAC system). This can further enhance the ability of the climate control system to achieve a desired operating condition.

Figure 14B:
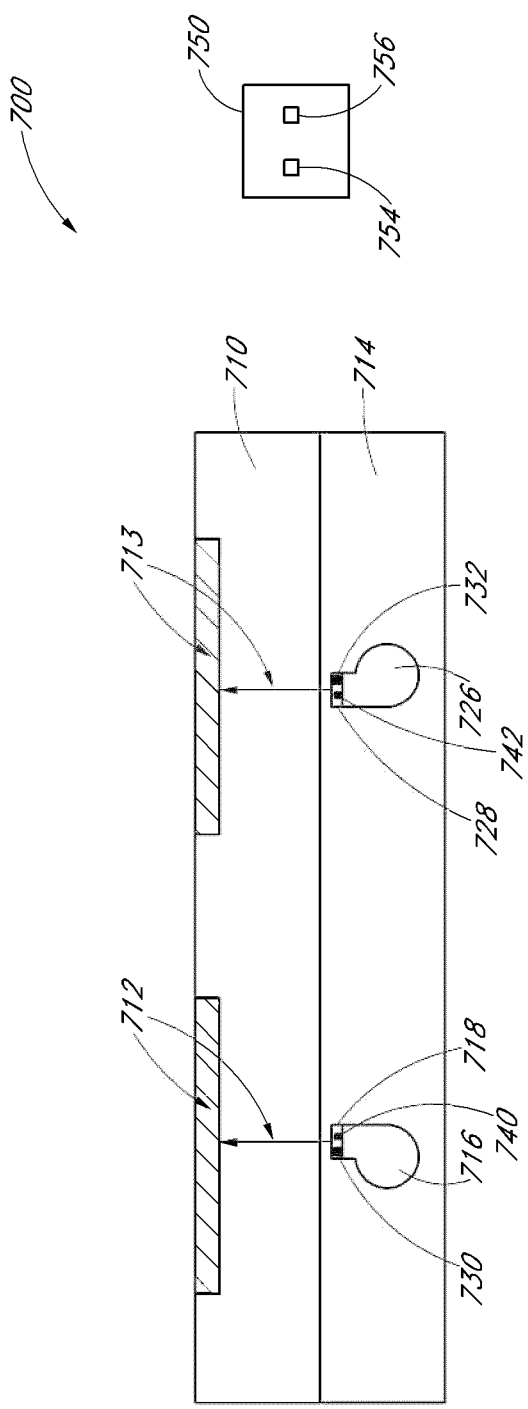
FIG. 14B illustrates one embodiment of a climate controlled bed comprising a plurality of sensors according to one embodiment.

In other embodiments, as illustrated in the bed assembly 700 of FIG. 14B, both a temperature sensor 730, 732 and a relative humidity sensor 740, 742 are provided within or near each TED 718, 728 or fluid module in which such TED is positioned (e.g., the inlet of the fluid transfer device 716, 726). In other arrangements, additional temperature and/or relative humidity sensors 754, 756 are included within other portions of the bed assembly 700 (e.g., within the lower portion 714 and/or upper portion 712, within a fluid distribution member 712, 713, etc), on a controller 750, on a wall of the room in which the bed assembly 700 is positioned and/or the like.

Regardless of the quantity, location, type and/or other details regarding the various sensors used in conjunction with a climate control system, such sensors can be advantageously configured to provide data and other information regarding the temperature and relative humidity of ambient air, the operational temperature of a particular climate controlled seating assembly (e.g., vehicle seat, bed, a medical bed, wheelchair, another medical chair, etc.) and/or the like to permit the seating assembly to be operated (e.g., automatically, if so desired) within a target comfort zone.

For example, as discussed herein with reference to FIG. 14A, the information transmitted from the various sensors to a controller can be used to automatically turn on or off and/or modulate various components of a climate controlled bed 700 or other seating assembly. In some arrangements, the fluid transfer devices and/or the TEDs are turned on or off, in accordance with a desired control scheme. As discussed, such beds and other seating assemblies can additionally include an occupant detection sensor that allows a control system to be notified when a user is seated or otherwise positioned thereon. Thus, a bed assembly 700 can be configured to automatically turn on or off and/or provide various levels of heated and/or cooled air when an occupant positions himself or herself thereon. This can advantageously eliminate the need for one or more manual controls (e.g., switches, controllers, etc.) that may otherwise be supplied with a climate controlled bed 700 or other seating assembly. Thus, such automated operational schemes can advantageously reduce both the cost and the complexity of providing and operating a climate controlled bed or other assembly.

In any of the embodiments disclosed herein, or equivalents thereof, the relative humidity sensors can be capacitance-based, resistance-based, thermal conductivity based and/or the like.

In simpler embodiments, a control algorithm is configured to receive only temperature data from one or more sensors. Alternatively, only relative humidity sensors can be used to provide information to a climate control system about the existing environmental conditions within or near a target seating assembly. In still other embodiments, additional information regarding the surrounding environment is provided to the control system, such as, for example, time of day, whether the ambient temperature is decreasing or increasing and/or the like. Accordingly, a target comfort zone 510 (e.g., FIG. 13) can be based on one, two, three or more variables, as desired or required.

Further, any of these control schemes can be used together with a condensation sensor and/or a wicking flow separator as discussed and illustrated in greater detail herein. For example, a control scheme operating within a target comfort zone can be overridden if a condensation sensor detects the presence of an undesirable level of fluid within the TED and/or other locations of the thermal module. Alternatively, the control scheme can be configured to continue operating toward a target comfort zone if a wicking material is provided within the thermal module to properly avoid condensation formation.

The systems, apparatuses, devices and/or other articles disclosed herein may be formed through any suitable means. The various methods and techniques described above provide a number of ways to carry out the invention. Of course, it is to be understood that not necessarily all objectives or advantages described may be achieved in accordance with any particular embodiment described herein. Thus, for example, those skilled in the art will recognize that the methods may be performed in a manner that achieves or optimizes one advantage or group of advantages as taught herein without necessarily achieving other objectives or advantages as may be taught or suggested herein.

Furthermore, the skilled artisan will recognize the interchangeability of various features from different embodiments disclosed herein. Similarly, the various features and steps discussed above, as well as other known equivalents for each such feature or step, can be mixed and matched by one of ordinary skill in this art to perform methods in accordance with principles described herein. Additionally, the methods which are described and illustrated herein are not limited to the exact sequence of acts described, nor are they necessarily limited to the practice of all of the acts set forth. Other sequences of events or acts, or less than all of the events, or simultaneous occurrence of the events, may be utilized in practicing the embodiments of the invention.

Although the invention has been disclosed in the context of certain embodiments and examples, it will be understood by those skilled in the art that the invention extends beyond the specifically disclosed embodiments to other alternative embodiments and/or uses and obvious modifications and equivalents thereof. Accordingly, it is not intended that the invention be limited, except as by the appended claims.

What is claimed is:

1. A fluid module for selectively heating or cooling air, the fluid module comprising:
    a thermoelectric device having a cold side and a hot side;
    a cold side comprising a cold side heat exchanger coupled to the cold side of the thermoelectric device and a cold side outlet in fluid communication with the cold side heat exchanger;
    a hot side comprising a hot side heat exchanger coupled to the hot side of the thermoelectric device and a hot side outlet in fluid communication with the hot side heat exchanger; and
    a separator gasket separating at least in part the cold side outlet from the hot side outlet, the separator gasket configured to draw condensate along a first surface facing the cold side of the of the fluid module away from at least a portion of the cold side of the fluid module and dissipate the condensate along a second surface opposite the first surface to the hot side of the fluid module, the separator gasket having a first dimension between the first surface and the second surface smaller than a second dimension extending along the first surface or the second surface.

2. The fluid module of claim 1, wherein the separator gasket comprises one or more wicking materials that separates at least in part the cold side outlet from the hot side outlet.

3. The fluid module of claim 2, wherein the one or more wicking materials comprise polypropylene or nylon.

4. The fluid module of claim 2, wherein the separator gasket includes at least one finger that extends into the cold side heat exchanger.

5. The fluid module of claim 4, wherein the at least one finger extends next to one or more fins that form at least in part the cold side beat exchanger.

6. The fluid module of claim 1, wherein the separator gasket includes at least one finger that extends into the cold side heat exchanger.

7. The fluid module of claim 6, wherein the at least one finger extends next to at least one or more fins that form at least part of the cold side heat exchanger.

8. The fluid module of claim 1, comprising a fluid transfer device positioned upstream of the thermoelectric device, the fluid transfer device in fluid communication with the cold side heat exchanger and the hot side heat exchanger.

9. The fluid module of claim 1, comprising a fluid transfer device positioned downstream of the thermoelectric device, the fluid transfer device in fluid communication with the cold side outlet and the hot side outlet.

10. The fluid module of claim 1, wherein the separator gasket comprises a porous structure.

11. A method of selectively heating or cooling air, the method comprising:
    transferring air to a cold side of a fluid module, the cold side of the fluid module comprising a cold side heat exchanger coupled to a cold side of a thermoelectric device and a cold side outlet in fluid communication with the cold side heat exchanger;
    transferring air to a hot side of the fluid module, the hot side of the fluid module comprising a hot side heat exchanger coupled to a hot side of the thermoelectric device and a hot side outlet in fluid communication with the hot side heat exchanger;

wicking condensate along a first surface on the cold side of the fluid module away from at least a portion of the cold side of the fluid module via a separator gasket; and dissipating the condensate along a second surface opposite the first surface to the hot side of the fluid module via the separator gasket, wherein the separator gasket comprises the first surface and the second surface and has a first dimension between the first surface and the second surface smaller than a second dimension extending along the first surface or the second surface.

12. The method of selectively heating or cooling air of claim 11, further comprising wicking the condensate to the hot side of the fluid module via the separator gasket.

13. The method of selectively heating or cooling air of claim 11, further comprising evaporating the condensate on the hot side of the fluid module.

14. The method of selectively heating or cooling air of claim 11, wherein wicking condensate away from at least a portion of the cold side of the fluid module comprises wicking condensate through the separator gasket, wherein the separator gasket separates the cold side outlet from the hot side outlet.

15. The method of selectively heating or cooling air of claim 14, wherein wicking condensate away from at least a portion of the cold side of the fluid module comprises wicking condensate through at least one finger wick that extends into the cold side beat exchanger.

16. The method of selectively heating or cooling air of claim 15, wherein wicking condensate away from at least a portion of the cold side of the fluid module wicking condensate through the at least one finger wick comprises wicking condensate away between one or more fins that form at least part of the cold side heat exchanger with the at least one finger wick extending next to the one or more fins.

17. The method of selectively heating or cooling air of claim 11, wherein wicking condensate away from at least a portion of the cold side of the fluid module comprises wicking condensate through at least one finger wick that extends into the cold side heat exchanger.

18. The method of selectively heating or cooling air of claim 11, wherein wicking condensate away from at least a portion of the cold side of the fluid module comprises wicking condensate along at least one finger wick that extends next to one or more fins that form at least part of the cold side heat exchanger.

19. The method of selectively heating or cooling air of claim 11, further comprising transferring air to the cold side heat exchanger and to the hot side heat exchanger through a fluid transfer device positioned upstream of the thermoelectric device.

20. The method of selectively heating or cooling air of claim 11, further comprising transferring air to the cold side heat exchanger and to the hot side heat exchanger via a fluid transfer device positioned downstream of the thermoelectric device.

21. A fluid module for selectively heating or cooling air, the fluid module comprising:

a thermoelectric device having a cold side and a hot side;

a cold side comprising a cold side heat exchanger coupled to the cold side of the thermoelectric device and a cold side outlet in fluid communication with the cold side heat exchanger;

a hot side comprising a hot side heat exchanger coupled to the hot side of the thermoelectric device and a hot side outlet in fluid communication with the hot side heat exchanger; and a separator gasket configured to draw condensate along a first surface on the cold side of the fluid module away from at least a portion of the cold side of the fluid module and dissipate the condensate along a second surface opposite the first surface to the hot side of the fluid module, the separator gasket having a first dimension between the first surface and the second surface smaller than a second dimension extending along the first surface or the second surface.

22. The fluid module of claim 21, wherein a portion of the separator gasket at least partially extends beyond a wall of the fluid module, the wall configured to direct fluid through the cold side outlet.

23. The fluid module of claim 22, wherein the first surface along the portion of the separator gasket extending beyond the wall of the fluid module is perpendicular to a longitudinal extent of the wall of the fluid module.

24. The fluid module of claim 21, wherein the separator gasket configured draw condensate extends from a side of the thermoelectric device toward a wall of the fluid module, the wall, configured to direct fluid through the cold side outlet.

* * * * *